US012654127B1

(12) United States Patent
Kolodji

(10) Patent No.: US 12,654,127 B1
(45) Date of Patent: Jun. 16, 2026

(54) APPARATUS AND METHOD FOR OXYGEN AND CARBON DIOXIDE ENRICHMENT OF ATMOSPHERIC AIR

(71) Applicant: Black Swan, LLC, Bakersfield, CA (US)

(72) Inventor: Brian Kolodji, Bakersfield, CA (US)

(73) Assignee: Black Swan, LLC, Bakersfield, CA (US)

(*) Notice: Subject to any disclaimer, the term of this patent is extended or adjusted under 35 U.S.C. 154(b) by 0 days.

(21) Appl. No.: 19/384,777

(22) Filed: Nov. 10, 2025

Related U.S. Application Data

(63) Continuation of application No. 17/121,560, filed on Dec. 14, 2020, now Pat. No. 12,465,884.

(51) Int. Cl.
B01D 53/22 (2006.01)
B01D 53/26 (2006.01)
(Continued)

(52) U.S. Cl.
CPC ......... B01D 53/226 (2013.01); B01D 53/261 (2013.01); B01D 53/265 (2013.01);
(Continued)

(58) Field of Classification Search
CPC .. B01D 53/226; B01D 53/261; B01D 53/265; B01D 53/62; B01D 53/85; B01D 63/043;
(Continued)

(56) References Cited

U.S. PATENT DOCUMENTS

| 4,073,089 | A | * | 2/1978 | Maginnes | ................ | A01G 9/18 |
| | | | | | | 47/17 |
| 5,034,126 | A | * | 7/1991 | Reddy | .................. | B01D 63/103 |
| | | | | | | 210/321.74 |

(Continued)

FOREIGN PATENT DOCUMENTS

| CN | 108430611 A | * | 8/2018 | ......... B01D 69/1216 |
| CN | 108883378 A | * | 11/2018 | ............. B01D 71/32 |

(Continued)

OTHER PUBLICATIONS

C. Maidana et al., Reduction of Fuel Consumption and Emissions of a Gas Turbine by Using of Oxygen-Enriched Combustion, 2nd Oxyfuel Combustion Conference.

(Continued)

*Primary Examiner* — Stephen Hobson
(74) *Attorney, Agent, or Firm* — James M. Duncan; Young Wooldridge, LLP

(57) ABSTRACT

A shell-less membrane provides for direct air capture of gas components by providing a selective barrier having a shell-less side at atmospheric pressure and an opposite side at a lower pressure. When the shell-less side is exposed to a first concentration of fast gas components and a first concentration of slow gas components, a portion of fast gas components and a portion of slow gas components flow through the selective barrier surface to form a permeate stream on the opposite side as a result of a pressure differential applied by a differential pressure device. The resulting permeate stream has a second concentration of fast gas components and a second concentration of slow gas components, wherein the second concentration of fast gas components is greater than the first concentration of fast gas components and the second concentration of slow gas components is less than the first concentration of slow gas components.

18 Claims, 28 Drawing Sheets

(51) Int. Cl.

| | |
|---|---|
| *B01D 53/62* | (2006.01) |
| *B01D 53/85* | (2006.01) |
| *B01D 63/04* | (2006.01) |
| *B01D 63/10* | (2006.01) |

(52) U.S. Cl.
   CPC ............. *B01D 53/62* (2013.01); *B01D 53/85* (2013.01); *B01D 63/043* (2013.01); *B01D 63/107* (2022.08); *B01D 2053/224* (2013.01); *B01D 2251/95* (2013.01); *B01D 2257/504* (2013.01); *B01D 2313/24* (2013.01); *B01D 2317/02* (2013.01)

(58) Field of Classification Search
   CPC ............ B01D 63/107; B01D 2053/224; B01D 2251/95; B01D 2257/504; B01D 2313/24; B01D 2317/02
   See application file for complete search history.

(56) References Cited

U.S. PATENT DOCUMENTS

| | | | | |
|---|---|---|---|---|
| 5,071,451 | A * | 12/1991 | Wijmans | B01D 53/225 95/52 |
| 5,682,709 | A * | 11/1997 | Erickson | A01G 7/02 47/1.4 |
| 6,108,967 | A * | 8/2000 | Erickson | A01G 7/02 47/1.01 R |
| 6,237,284 | B1 | 5/2001 | Erickson | |
| 6,745,580 | B1 * | 6/2004 | Brown | F24F 13/222 62/272 |
| 7,842,264 | B2 * | 11/2010 | Cooper | C07C 29/1518 423/220 |
| 8,002,875 | B1 * | 8/2011 | Bossard | C01B 3/501 95/55 |
| 8,137,527 | B1 * | 3/2012 | Woods | B01D 53/965 205/555 |
| 8,197,857 | B2 * | 6/2012 | Dressler | A01G 33/00 210/600 |
| 8,252,091 | B2 * | 8/2012 | Anand | B01D 53/1475 95/177 |
| 8,595,020 | B2 * | 11/2013 | Marino | G06Q 50/00 705/1.1 |
| 8,617,292 | B2 * | 12/2013 | Hasse | B01D 71/64 62/928 |
| 8,852,319 | B2 * | 10/2014 | Wijmans | F23J 15/02 423/220 |
| 8,889,400 | B2 * | 11/2014 | Martin | C12N 13/00 435/257.1 |
| 8,999,038 | B2 * | 4/2015 | Ungerank | B01D 53/225 95/47 |
| 9,266,057 | B1 * | 2/2016 | Jones | B01D 53/1425 |
| 9,359,750 | B1 * | 6/2016 | Perez | F15D 1/02 |
| 9,433,887 | B2 | 9/2016 | Wijmans et al. | |
| 9,433,896 | B2 * | 9/2016 | Eisenberger | B01D 53/0462 |
| 9,514,493 | B2 | 12/2016 | Marino | |
| 10,687,477 | B1 * | 6/2020 | Kolodji | A01G 9/02 |
| 10,897,851 | B1 * | 1/2021 | Kolodji | A01G 7/02 |
| 10,898,846 | B1 * | 1/2021 | Kolodji | B01D 53/84 |
| 11,383,199 | B1 * | 7/2022 | Kolodji | B01D 53/229 |
| 2004/0134347 | A1 * | 7/2004 | Gobina | B01D 63/065 95/45 |
| 2004/0211726 | A1 * | 10/2004 | Baig | B01D 53/22 210/640 |
| 2005/0229778 | A1 * | 10/2005 | Backhaus | B01D 53/22 95/45 |
| 2008/0163753 | A1 * | 7/2008 | Bossard | B01D 53/22 95/55 |
| 2010/0116129 | A1 * | 5/2010 | Molaison | B01D 53/229 96/5 |
| 2010/0205960 | A1 * | 8/2010 | McBride | F02C 6/16 60/595 |
| 2010/0210745 | A1 * | 8/2010 | McDaniel | C09D 7/48 521/55 |
| 2010/0269698 | A1 * | 10/2010 | Yates | B01D 71/64 96/13 |
| 2011/0005272 | A1 * | 1/2011 | Wijmans | B01D 53/225 62/617 |
| 2011/0195473 | A1 * | 8/2011 | Wilhelm | B01D 53/84 435/292.1 |
| 2011/0260112 | A1 * | 10/2011 | Wijmans | F23J 15/006 252/372 |
| 2012/0003722 | A1 * | 1/2012 | Polak | B01D 53/78 426/477 |
| 2012/0009109 | A1 * | 1/2012 | Wright | B01D 53/75 423/247 |
| 2012/0171053 | A1 * | 7/2012 | Wang | F04B 33/005 417/63 |
| 2013/0058853 | A1 * | 3/2013 | Baker | B01D 53/62 423/220 |
| 2013/0263734 | A1 * | 10/2013 | Wynn | B01D 71/32 95/54 |
| 2014/0286797 | A1 * | 9/2014 | Tamm | F01C 21/08 417/68 |
| 2014/0360365 | A1 * | 12/2014 | Wynn | B01D 53/22 95/45 |
| 2015/0292807 | A1 * | 10/2015 | Romeo | F28F 9/0131 165/104.21 |
| 2017/0021311 | A1 * | 1/2017 | Berzinis | B01D 67/00165 |
| 2017/0271701 | A1 * | 9/2017 | Berlowitz | H01M 8/04805 |
| 2017/0320009 | A1 * | 11/2017 | Hirata | B01D 53/1443 |
| 2017/0341942 | A1 * | 11/2017 | Harper, Jr. | F01K 7/16 |
| 2018/0058008 | A1 * | 3/2018 | Wright | D21H 17/66 |
| 2018/0067091 | A1 * | 3/2018 | Burkhalter | G01N 33/0016 |
| 2019/0060835 | A1 * | 2/2019 | Ding | B01D 53/002 |
| 2019/0321787 | A1 * | 10/2019 | Sivaniah | B01D 71/0281 |
| 2020/0056578 | A1 * | 2/2020 | Sheldon-Coulson | B63B 1/048 |
| 2020/0061529 | A1 * | 2/2020 | Zhu | F25D 17/042 |
| 2020/0141410 | A1 * | 5/2020 | Kawasaki | F04C 23/001 |
| 2020/0318793 | A1 * | 10/2020 | Kolodji | F17C 9/02 |
| 2021/0016233 | A1 * | 1/2021 | Noda | B01D 65/003 |
| 2021/0060483 | A1 * | 3/2021 | Lackner | B01D 7/02 |
| 2021/0121826 | A1 * | 4/2021 | Kolodji | B01D 53/226 |
| 2022/0161197 | A1 * | 5/2022 | Kolodji | B01D 53/227 |
| 2025/0073632 | A1 * | 3/2025 | Khalit | B01D 53/1462 |

FOREIGN PATENT DOCUMENTS

| | | | | | |
|---|---|---|---|---|---|
| CN | 109414653 | A * | 3/2019 | | B01D 65/003 |
| CN | 109475823 | A * | 3/2019 | | B01D 69/02 |
| CN | 110049808 | A * | 7/2019 | | B01D 69/04 |
| CN | 111939764 | A * | 11/2020 | | B01D 63/065 |
| DE | 102004049718 | A1 * | 4/2006 | | B01D 7/00041 |
| DE | 202019001414 | U1 | 5/2019 | | |
| GB | 2457929 | A | 9/2009 | | |
| JP | WO2012153809 | A | 11/2012 | | |
| WO | WO-2010100432 | A2 * | 9/2010 | | B01D 71/0223 |
| WO | WO-2012153770 | A1 * | 11/2012 | | B01D 71/0281 |
| WO | WO-2017114522 | A1 * | 7/2017 | | B01D 69/10 |
| WO | WO-2018051053 | A1 * | 3/2018 | | B01D 69/08 |
| WO | WO-2019006438 | A1 * | 1/2019 | | B01D 69/14111 |
| WO | WO-2021065889 | A1 * | 4/2021 | | B01D 53/22 |

OTHER PUBLICATIONS

B.A. Kimball et al. Effects of Increasing Atmospheric CO2 on Vegetation printed in CO2 and Biosphere by J. Rozema et al. at p. 65, Kluwer Academic Publishers, 1993.

T. Brinkman, Theoretical and Experimental Investigations of Flat Sheet Membrane Module Types for High Capacity Gas Separation Applications, Chemie Ingenie Technik, vol. 85, Issue 8, pp. 1210-1220, May 17, 2013.

B. A. Kimball et al, Seventeen Years of Carbon Dioxide Enrichment of Sour Orange Trees: Final Results, Global Change Biology (2007) 13, 2171-2183.

T.C. Merkel et al, Power Plant Post-Combustion Carbon Dioxide Capture: An Opportunity for Membranes, Journal of Membrane Science 359 (2010) 126-139.

(56)     References Cited

OTHER PUBLICATIONS

K.P. Shah, Construction, Working, Operation and Maintenance of Liquid Ring Vacuum Pumps, www.practicalmainteance.net, Jan. 2017.

R. Castro-Munoz, et al., A new relevant membrane application: CO2 direct air capture (DAC), Chemical Engineering Journal 226, 2022.

E.S. Sanz-Perez, et al., Direct Capture of CO2 from Ambient Air, Chemical Reviews, ACS Publications, Aug. 25, 2016.

S. Fujikawa, et al., Ultra-Fast, Selective CO2 Permeation by Free-Standing Siloxane Nanomembranes, Chemical Society of Japan, Jul. 14, 2019.

S. Fukikawa, et al., A New Strategy for Membrane-Based Direct Air Capture, Polymer Journal, Oct. 15, 2020.

D.W. Keith, et al., A Process for Capturing CO2 from the Atmosphere, Joule 2, 1573-1594, Aug. 15, 2018.

* cited by examiner

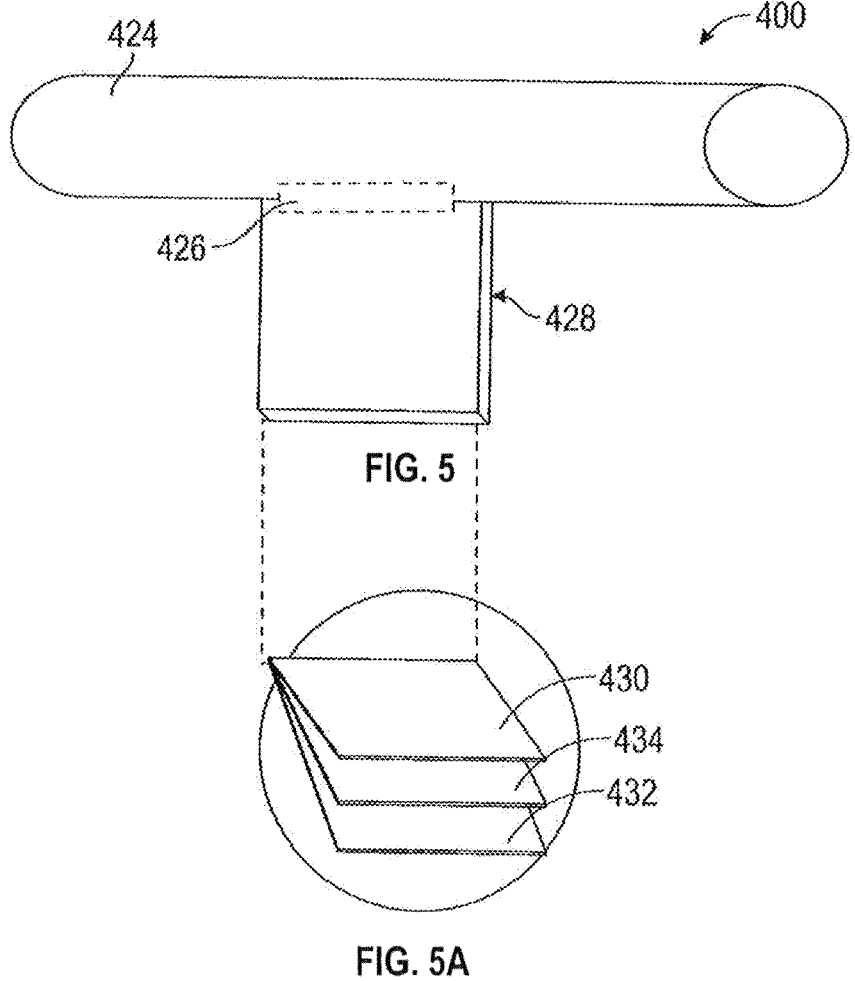
FIG. 5
FIG. 5A
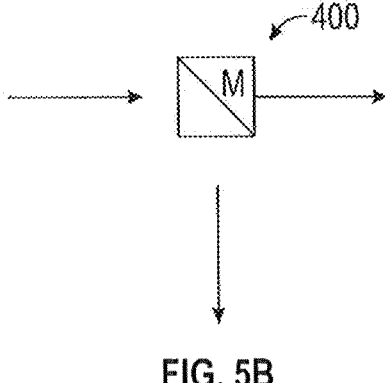
FIG. 5B

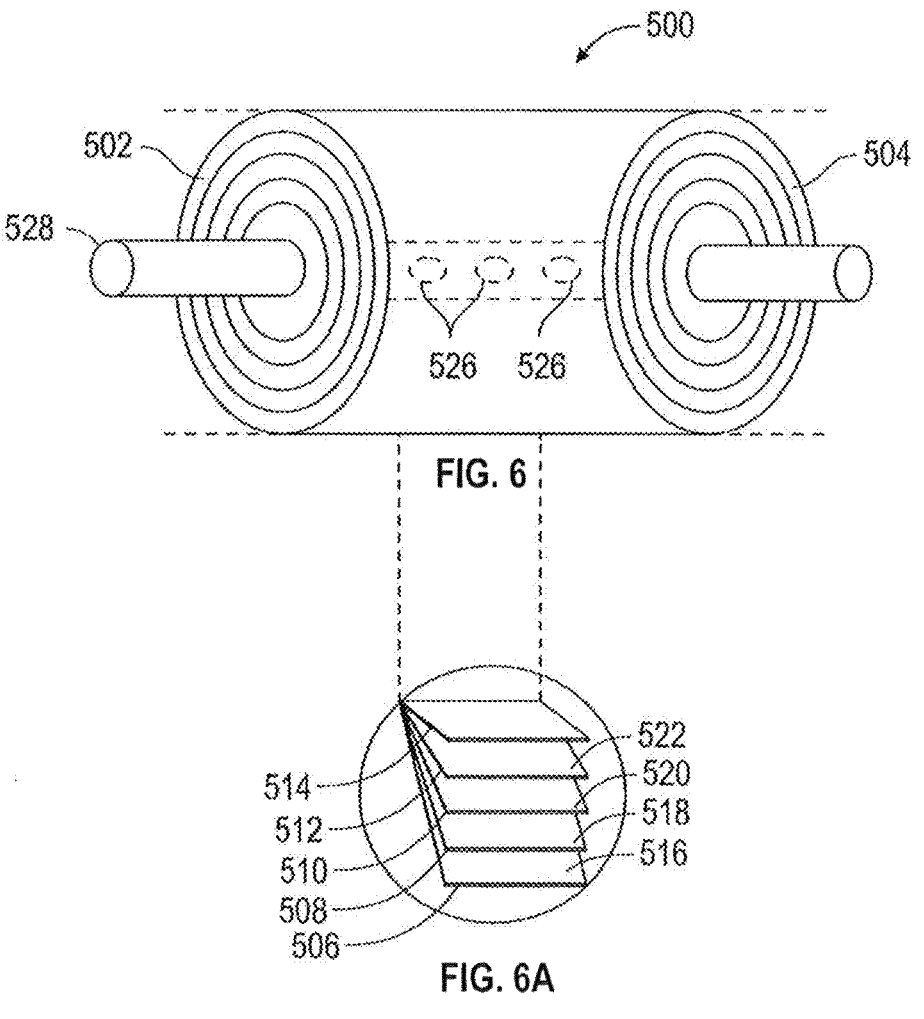
FIG. 6
FIG. 6A
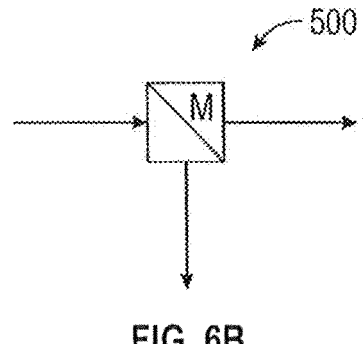
FIG. 6B

1002

1006

1000

B

1300

1300'

1300"

1300""

1800
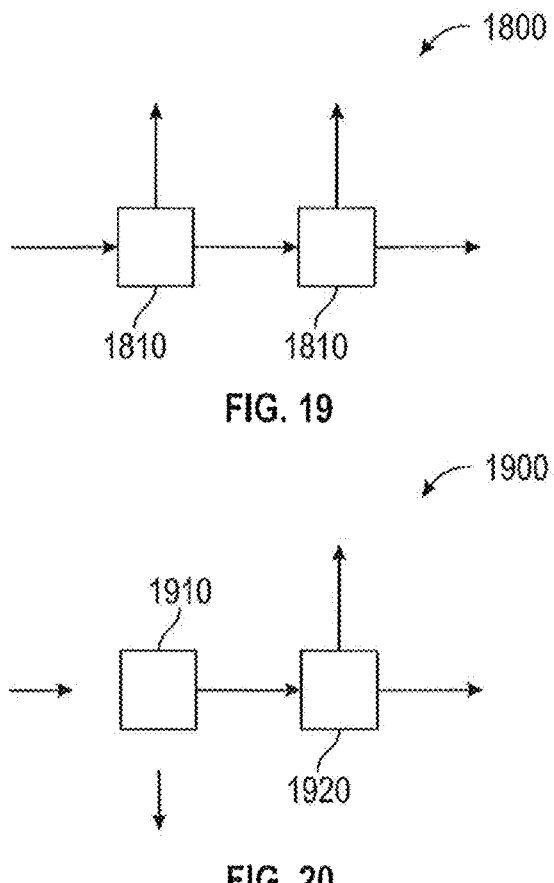
1810          1810
FIG. 19
1900
1910
1920
FIG. 20
2000
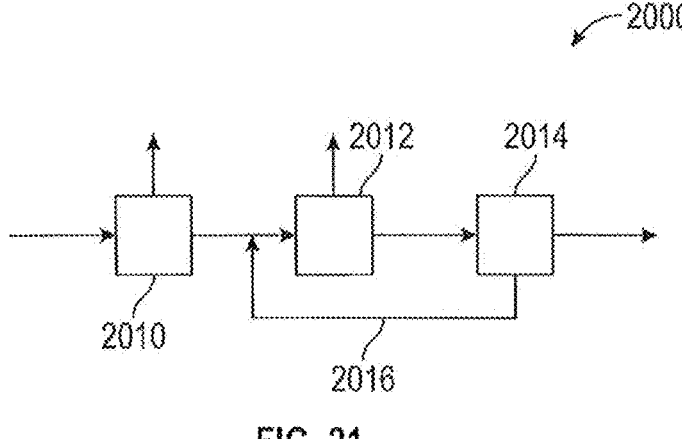
2010          2012          2014
2016
FIG. 21

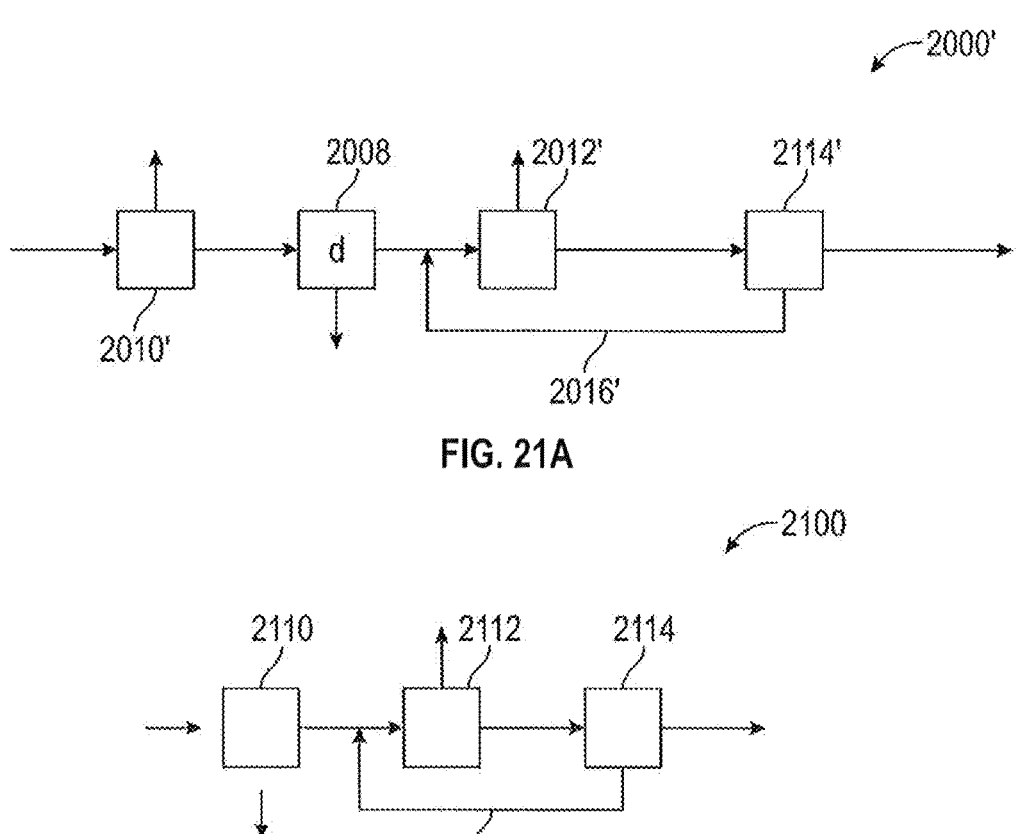
FIG. 21A
FIG. 22
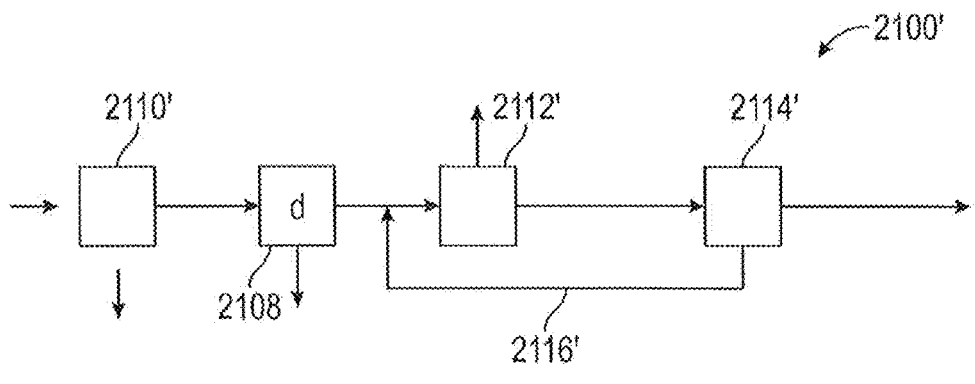
FIG. 22A

APPARATUS AND METHOD FOR OXYGEN AND CARBON DIOXIDE ENRICHMENT OF ATMOSPHERIC AIR

BACKGROUND OF THE INVENTION

This invention relates to enriching (increasing) the oxygen and carbon dioxide components into a permeate as generated from an atmospheric air stream as processed through a membrane configuration operating under an internally applied vacuum. Embodiments of the present invention may utilize what the inventor herein refers to as a "wig" configuration. This title refers to a membrane construction comprising a plurality of individual hollow fiber membrane elements which all pass a gas permeate into a collection member commonly, but not necessarily, at a common end of the membrane elements, which loosely approximates the configuration of individual strands of hair attached to a wig cap or caps.

It is known that carbon dioxide is a major contributor to global warming. Global warming is a result of increasing concentrations of greenhouse gases ("GHG") in the atmosphere. Industrial facilities, power plants, and transportation are the primary greenhouse gas ($CO_2$) contributors accounting for over 80% of greenhouse gas production in the world. Carbon dioxide is the primary anthropogenic (i.e., man-made) GHG, accounting for a substantial portion of the human contribution to the greenhouse effect in recent (under 200) years.

A carbon dioxide enriched product produced by use of this membrane configuration may be forwarded to a sequestration facility to prevent release of the carbon dioxide into the atmosphere. Embodiments of this membrane configuration may be utilized to reduce the overall concentration of carbon dioxide in the atmosphere by direct removal of the $CO_2$ from the air, also known as Direct Air Capture. Embodiments of this membrane configuration may also be utilized to reduce $CO_2$ added to the atmosphere generated by energy consumed during a process, for example by reducing the consumption of non-renewable fuel utilized to power a process or fuel combusted within the process. The term "sequestration facility" is defined herein as anyone of a variety of mechanisms which sequester the carbon dioxide thereby preventing immediate release back into the atmosphere. The term may include systems which utilize bio-sequestration, such as orchards, crops, forests, and other photosynthetic organisms which either convert carbon dioxide utilizing photosynthesis or store the carbon dioxide in the organism. The sequestration facility may also include manufacturing processes which utilize or make a product with carbon dioxide, including production of dry ice utilized for preserving items requiring cold storage during transport such as various foods and medicines. The sequestration facility may also include a system which injects carbon dioxide into petroleum reservoirs for purposes of enhanced oil recovery such as miscible flooding.

A process of the presently disclosed invention utilizes membranes to provide an enriched oxygen stream—as opposed to the commonly used air feed stream—to a flue gas generator, or other devices which use air or oxygen in a reaction process to produce a product, (sometimes collectively referred to herein as "oxygen reaction devices") to decrease the energy demand and/or increase the capacity of such oxygen reaction devices. The use of the enriched oxygen stream realized through the membrane configurations disclosed herein may thereby decrease non-renewable fuel (natural gas, gasoline, coal) consumption and thereby reduce the production of green house ($CO_2$) gas emissions. As well, the $CO_2$ in the flue gas of an oxygen enriched flue gas generator is more highly concentrated, making the $CO_2$ more economically capturable.

For purposes of this disclosure, the term "flue gas generator" is defined as a stationary (non-mobile) or mobile device which normally emits elevated concentrations of carbon dioxide to atmosphere within an emitted gas stream. Examples of stationary flue gas generators are industrial steam generators, biogas/natural gas/coal fired power plants, ethanol plants, amine regenerators, cement manufacturing kilns, fermenters, water heaters and heater furnaces. Examples of mobile flue gas generators are automobiles, trains, and air planes with internal combustion or jet engines. Examples of other "oxygen reaction devices" include activated sludge reactors producing biogas, sulfur recovery units making sulfur from a refinery or gas plant acid gases, ethylene oxide production units, syngas plants, and apparatus utilized in pyrolysis processes and glass manufacturing.

In the case of stationary flue gas generators, the flue gas with highly enriched $CO_2$, can be captured and thus utilized for various commercial uses, which may include enhanced oil recovery operations, agricultural use, medical applications, and other known commercial applications.

There is an ongoing and critical need for additional mechanisms and methods for reducing consumption of non-renewable fuels and reducing energy's contribution to atmospheric carbon dioxide, also known as energy carbon management.

SUMMARY OF THE INVENTION

Embodiments of the present invention exploit the unique property of membranes to economically achieve direct air capture and/or produce an enriched carbon dioxide stream from atmospheric air (i.e., having an approximate normal air dry composition of 20.9% Oxygen, 78.05% Nitrogen, and 0.04% or 400 ppm $CO_2$ by volume). Water composition in air varies more than other components and is significant depending on ambient temperature. Water vapor concentration in normal air can be as high as 4% at 120F, and for example, at −40F. can be as low as 0.2%. Carbon dioxide, oxygen, and water vapor is separated from nitrogen in the air feed stream by the disclosed membrane configuration to produce a permeate or product stream comprising enriched (higher than normal air) concentration of carbon dioxide, oxygen and water, and a separate residue or biproduct stream with enriched nitrogen.

Processes utilizing the membrane configurations disclosed herein are distinguishable from other known processes which yield only highly purified (90%+) concentrations of carbon dioxide, nitrogen, and oxygen, such as cryogenic air separation units (ASUs) or Vacuum Pressure Swing Absorption (VPSA). ASU systems require significantly higher capital expense and significantly higher operating costs. Moreover, these systems may present significantly higher operational risks because of high operating pressures and/or sub-freezing operating temperatures. VPSA and conventional multiple stage prior art hollow fiber require higher feed and operating pressures. In comparison, embodiments of the present invention operate at low pressure and near ambient temperature. In the case of conventional membranes, the air is pressurized at conventionally 120 to 150 psig into the tube side channels, tube-sheets and through the internal bore of the hollow fiber tubes, and the permeate passes through the pressurized tube inner wall to pass into the shell enclosed side encasing the bundle of membrane tubes.

In contrast, embodiments of the presently disclosed membrane units drive the feed not by pressurizing the much higher capacity feed stream, but by pulling a vacuum on the relatively smaller product permeate stream into the bore side of the tubes, a stream with ⅓ to ½ the total volume of the feed gas, thus requires ⅓ to ½ the energy required for conventional membrane. The performance of the membranes of the present invention is also approximately 30% higher than for conventional air separation membranes, because there is no pressure drop on the residue side, and the membranes of the present invention have air first contact with the hollow fiber tube on the exterior wall of the tube, which has inherently high area per tube than the conventional membrane's air first contact of the inner bore wall. Performance is further enhanced by the lack of any pressure drop on the residue side, and higher volume flow rates allowed on the "shell-less shell side." The commercial manufacturing cost of the membranes of the present invention may be significantly reduced, as embodiments of the membranes of the present invention can be produced with a single tube sheet instead of two tube-sheets and does not need a shell enclosure.

Embodiments of the present invention may further have a desiccant system on the 1st stage permeate, which potentially saves approximately 40% on the downstream stage energy in comparison to conventional membrane processes. It is noted that the materials and technology utilized in the field of membranes take advantage of an aspect not available to the cryogenic or specifically more competitive VPSA adsorption materials and technology. Specifically, a membrane can equally process $CO_2$ and oxygen in a vacuum as it can under pressure. Membranes perform based on Fick's law and the higher the partial pressure differential between the permeate and the feed, the primary process control parameter driving "flux" or a component's flowrate through the membrane to the permeate side of a specific material, the better the separation performance of the membrane. Thus, if the partial pressure drop is caused by a difference between two positive partial pressures or a negative or vacuum based partial pressure and positive partial pressure are equal, the performance of the membrane is the same, all else being equal. Not so for adsorbents. Adsorbent performance is based on the Langmuir isotherm where the fraction adsorbed varies linearly with partial pressure. Thus if the absolute partial pressure increases, then adsorption increases, and vice versa, thus this is why regeneration or desorption can occur in a vacuum Embodiments of the presently disclosed membrane units may be configured in with a primary (single stage) unit producing a mild or moderate increase (enrichment) in concentration of oxygen (up to 50%), water, and carbon dioxide (up to 1200 ppm) in a product stream which is achieved by utilizing the membrane unit to separate out nitrogen from normal ambient atmospheric air. When utilized for oxygen enrichment of the combustion air with a flue gas generator the resulting concentration of $CO_2$ emitted from the flue generator may be over 20%, and 33% when water is removed. The resulting permeate stream does not have to be highly purified in carbon dioxide or oxygen or water to attain significant benefits, although the resulting permeate may be further processed with embodiments of this invention to produce highly purified oxygen with a secondary and/or tertiary (2nd and/or 3rd stage) membrane or other form of enrichment, and highly purified $CO_2$ (up to 90% requires at least a third stage.) By capturing and removing water from the flue gas of a highly oxygen (up to 90%) enriched combustion oxygen fed stationary flue gas generator, a very highly purified (99%+-potable) water as removed from the $CO_2$ bearing flue gas of a flue gas generator with embodiments of the present invention can be achieved.

Embodiments of the presently disclosed membrane units may utilize membrane materials having properties similar to those of the cellulose acetate based sheet membrane units of the flat or spiral wound type such as used in the Separex™ membrane product as manufactured by Honeywell/UOP, or other polymeric based membrane materials such as used in "plate and frame" type Polaris™ membranes units as manufactured by MTR, Inc., or used in hollow fiber type membrane units such as Cynara™ membranes manufactured by Schlumberger, or PRISM™ membranes as manufactured by Air Products, or Nitrox™ membranes systems as manufactured by Generon. However, these known conventional membrane devices have significant supporting structure and require multiple blowers or compressors for operation of the systems as compared to the processes required for membranes having the wig configuration disclosed herein.

Membranes configured from the above listed membrane materials and products may be utilized to enrich the oxygen, water, and carbon dioxide concentrations of a gas stream processed through the membrane units. Carbon dioxide, water, and oxygen pass or permeate more rapidly through the membrane relative to nitrogen, thereby forming a permeate stream which is more concentrated or enriched in oxygen, water, and carbon dioxide than the "feed" stream. It is noted that the term "feed" is used somewhat loosely for purposes of this disclosure and does not refer to a stream delivered to the membrane via a compressor or blower and with an intake or similar structure. With embodiments of the presently disclosed wig membrane configuration, a "feed" side of the membrane unit is simply the air exposed exterior sides of a collection of membrane hollow fiber tubes, which are suspended on one or both ends by a tubesheet(s), where a gas (i.e., air) flows or blows against the exterior outside walls of the deployed tubes. The air can blow as wind naturally, or warm air under (150F) can be force drafted, such as from the discharged air of an air-cooling unit, across the external wall of the membrane tubes. It may be noted that for this embodiment of the invention, providing a higher velocity air passing over the exposed hollow fiber tubes, and/or a higher temperature over the exposed hollow fiber tubes further improves the performance (energy savings and enrichment) of the wig membrane unit above the conventional prior art hollow fiber membrane units (CHFMU).

Other significant benefits of the "wig" membrane units over conventional membrane units, especially CHFMU, is the lower fabrication cost of the membranes having the wig configuration. As indicated above, these savings are due in part due to an embodiment of the primary wig membrane unit having only a single outlet tube sheet—as all CHFMU used for oxygen enrichment from air have two tube sheets, an inlet tube sheet and an outlet tubesheet. Further, all embodiments of the primary wig membrane unit have no shell unlike all CHFMU. Another benefit of the wig configuration over CHFMU is lower energy consumption due to lower pressure drop, higher performance (i.e., capable of producing higher concentrations of oxygen due to the lower pressure drop), and pliability of the membrane allowing better fit into secondary membrane structures as needed for other membrane configurations.

The permeate-nitrogen depleted air—is brought into the interior (bore) of each membrane tube by a vacuum applied to the open end or ends of each membrane tube at the outlet tubesheet(s). Gas components, predominantly nitrogen, which pass relatively slowly through the membrane in comparison to oxygen, carbon dioxide and water, remain mostly on the outside of the membrane tubes, and pass over the tubes remaining in the atmosphere. The permeate is collected through tubesheet(s) into a permeate conduit or channel, such as ducting, which collects the permeate from one or more of the wig membrane units and forwards the permeate as desired.

In one embodiment of the invention, a stationary flue gas generator may be disposed between a primary membrane unit and a sequestration facility as defined above. The oxygen reaction processes utilized in flue gas generators conventionally use atmospheric air that produce a wet (meaning concentration with water) flue gas that contains lower nitrogen concentrations (65 to 74%) and much higher carbon dioxide concentrations (5 to 11%) with respect to that found in wet atmospheric air (approximately 78% and 0.04%, respectively.) As indicated above, the flue gas produced by introducing the permeate stream generated from the disclosed membrane units in place of conventional atmospheric air, can have a lower yet (almost half) the concentration of nitrogen (down to 40%) and higher yet concentration (almost double) of over 20% carbon dioxide in the flue gas, thus a flue gas significantly more dilute in the component nitrogen and much more significantly higher in concentration of the component carbon dioxide than in atmospheric air or than in the flue gas exhaust from a conventional flue gas generator using atmospheric air for combustion. This carbon dioxide in the flue gas can be even more concentrated in CO2 (up to 80%) when a secondary membrane unit is added, and the bulk component of water is removed (in a usable and pure form as a separate product) thus making the flue gas itself actually a highly concentrated CO2 product that can be more economically transported, processed and capturable as may then be utilized in more of the types of sequestration facilities discussed above.

Further, these lower concentrations of nitrogen produced in the oxygen feed replacing combustion air to the flue gas generator contribute to decreasing the volume of gas processed through the flue gas generator, and thus allows for increased capacity and thermal efficiency (due to the thermal properties of CO2 versus nitrogen) of the flue gas generator, providing fuel savings while lowering NOX production and concentration in the flue gas emissions. Further, the higher firing temperature in the flue gas generator because of reduced nitrogen concentration, allows for low heat value fuels, such as renewable biogas, to be used without requiring supplemental feed of high heat value non-renewable fuels, such as natural gas. The higher firing temperature also produces a more valuable and recoverable waste heat, adding further to the thermal efficiency and fuel savings. In some embodiments of the invention the flue gas generator may be pressurized thereby eliminating the need for downstream cooling/pressurization of the flue gas prior to be being processed for sequestration.

For higher than 90% concentration of oxygen, especially useful in other devices which use air or oxygen in a reaction process to produce a product other than flue gas generators, embodiments of the present invention may also comprise a secondary (or tertiary) enrichment system which utilizes the permeate from a primary or first stage membrane unit as a feed for secondary membrane units contained within enclosures such as conduit or piping or as feed for a cryogenic air separation unit (ASU), or a vacuum pressure swing adsorption unit (VPSA), or a temperature swing absorption unit (TSA) or other forms of oxygen separation such as ion transport membranes (ITM). In the case of using 90% oxygen in a flue gas generator, the flue gas can have dry concentrations of CO2 that exceeds 90%. Another benefit of using primary enrichment is the significant reduction in capital and operating cost of the secondary enrichment system.

A further benefit of another embodiment of the invention is the use of a recycle stream of cooled flue gas to the combustion zone (oxygen enriched feed location) to mitigate higher firing temperatures produced when oxygen enrichment to a flue gas generator is used, also known conventionally as oxy-combustion. This requires a larger vacuum device at the outlet tubesheet if only a primary wig membrane unit is used, or larger vacuum or blower device at the outlet of a secondary enrichment system when a secondary enrichment system is used. Secondary oxygen enrichment with recycle allows for even higher concentrations to be produced in the dried flue gas (over 90% $CO_2$.) Specifically, when high oxygen concentrations (higher than 35%) oxygen is processed conventionally in a flue gas generator, costly modifications to the furnace refractory and burner are conventionally required. With the disclosed embodiment of the recycle stream, plug and play is allowed with higher concentrations of oxygen enrichment. Plug and play is defined as no modifications being required of the existing burner or refractory of the flue gas generator, because the higher combustion temperature found in conventional oxygen enrichment combustion is mitigated or brought back to conventional air fired combustion temperatures with the cooled and recycled flue gas. Thus, the additional benefit of the recycle stream, that being plug and play, also provides significant savings of capital cost and schedule time due to simplicity of implementation of the embodiment of the invention. A unique vacuum system may be utilized for application of vacuum to the primary and secondary membrane units. The disclosed bellows system is relatively simple and requires low power input to generate the vacuum necessary to process a feed gas through the disclosed membrane units.

Methods of direct air capture of carbon dioxide utilizing membrane members under vacuum is also disclosed.

US 12,654,127 B1

7 secondary, etc.) stage pressurized bank embodiment of a gas phase single or multistage bank(s) enrichment system of the present invention.

Figure 2:
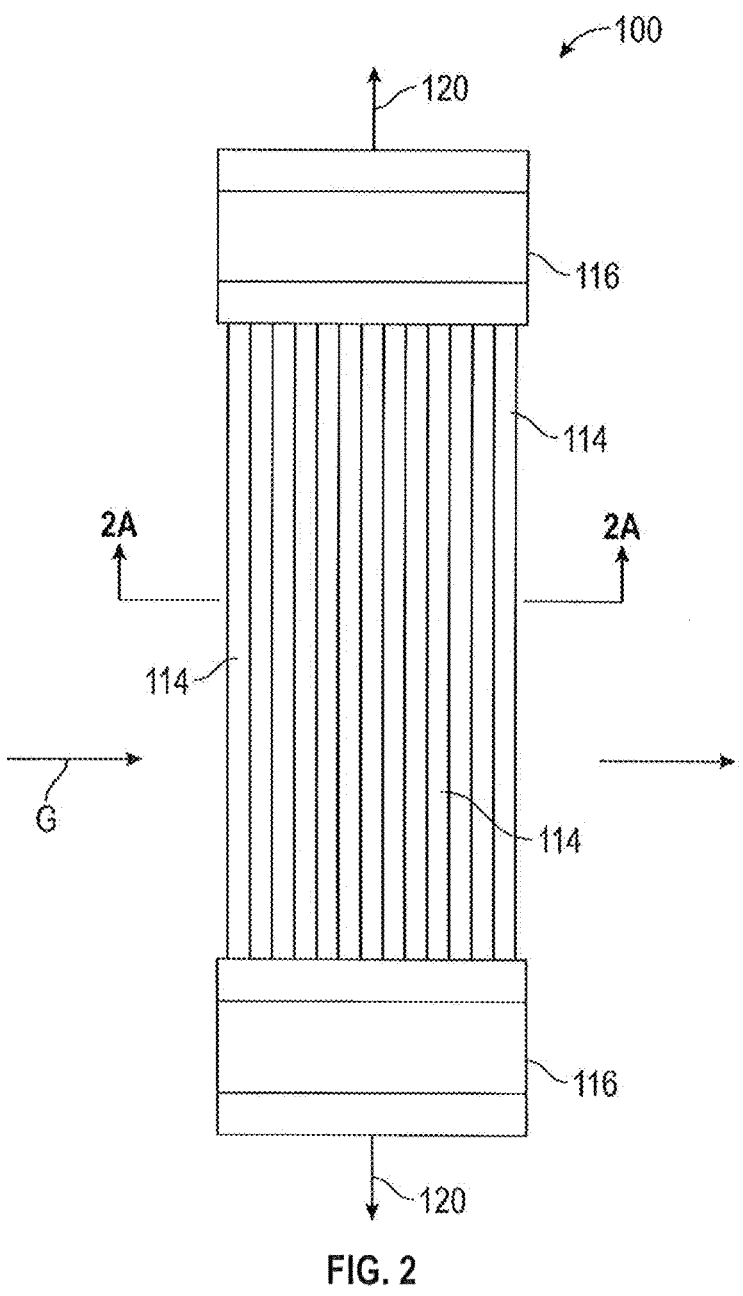
FIG. 2 depicts an embodiment of an ambient air/residue exposed or draft or pressurized hollow fiber membrane unit wherein there is no shell enclosure, having a "wig" configuration having permeate flowing to both hollow fiber membrane tube sheets of the hollow fiber wig draft membrane unit for primary (first) stage draft bank only, or any (primary.
Figure 2A:
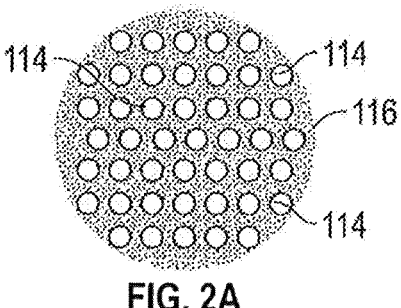

FIG. 2A is a sectional view along line 2A-2A of FIG. 2.

Figure 2B:
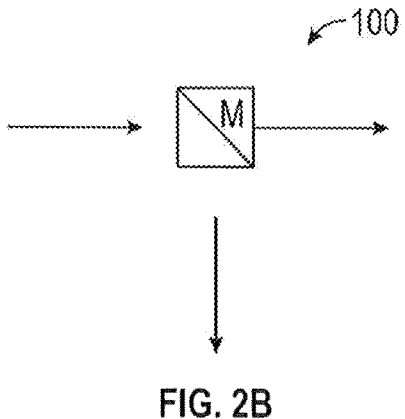

FIG. 2B is a schematic depiction of a generalized embodiment of a draft membrane unit which includes the embodiment of the draft hollow fiber wig membrane unit depicted in FIG. 2.

Figure 3:
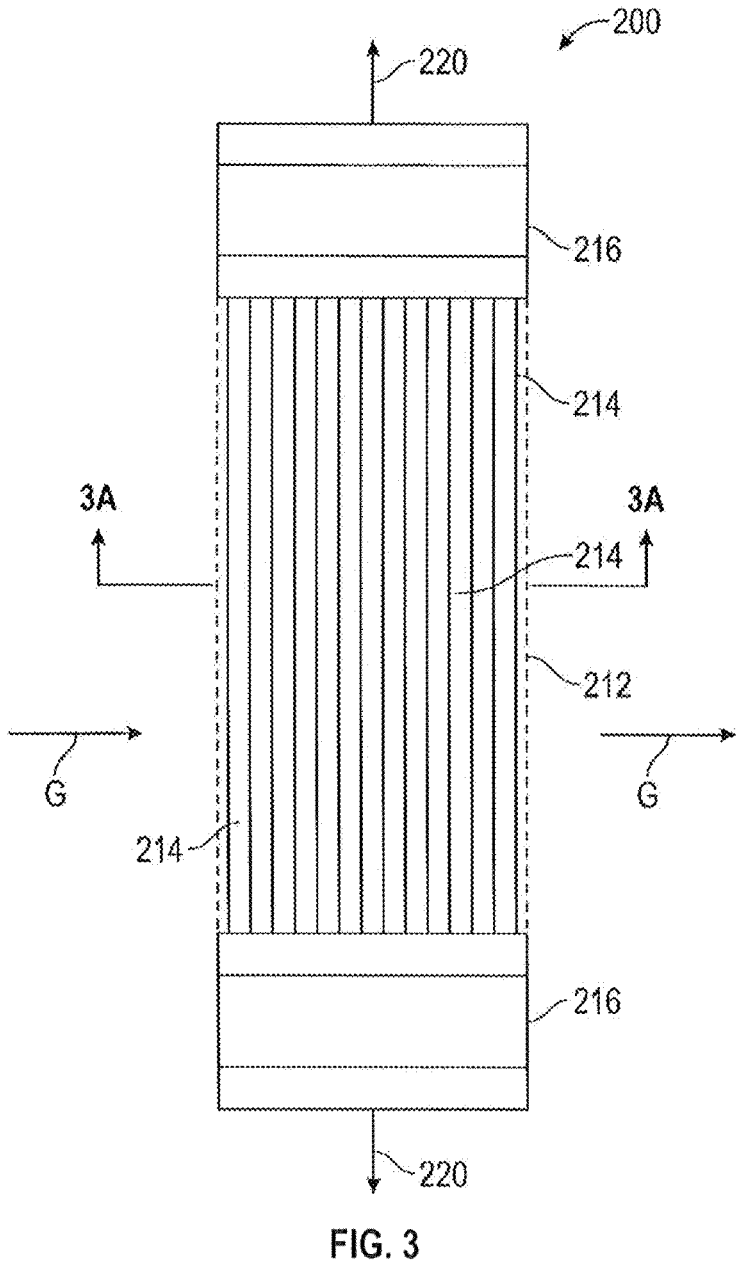

FIG. 3 depicts an embodiment of a draft or pressurized hollow fiber wig membrane unit having a wig configuration having permeate flowing to both hollow fiber membrane tube sheets, wherein the membrane tubes are set within a perforated shell of the hollow fiber wig membrane unit for primary (first) stage draft bank only, and/or any (primary, secondary, etc.) stage pressurized bank embodiment of a gas phase single or multistage bank(s) enrichment system of the present invention.

Figure 3A:
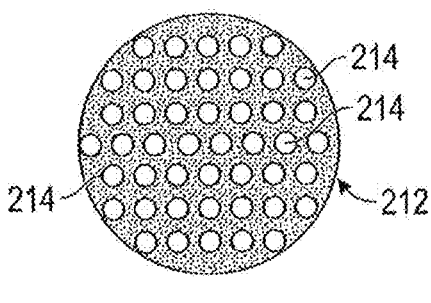

FIG. 3A is a sectional view along line 3A-3A of FIG. 3.

Figure 3B:
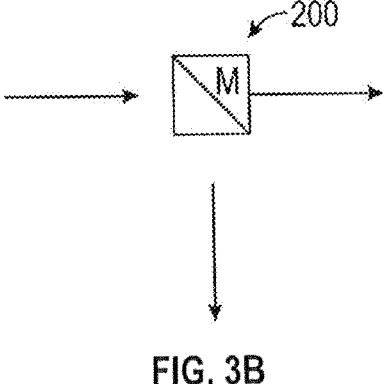

FIG. 3B is a schematic depiction of a generalized embodiment of a draft membrane unit which includes the embodiment of the draft (only) hollow fiber wig membrane unit depicted in FIG. 3.

Figure 4:
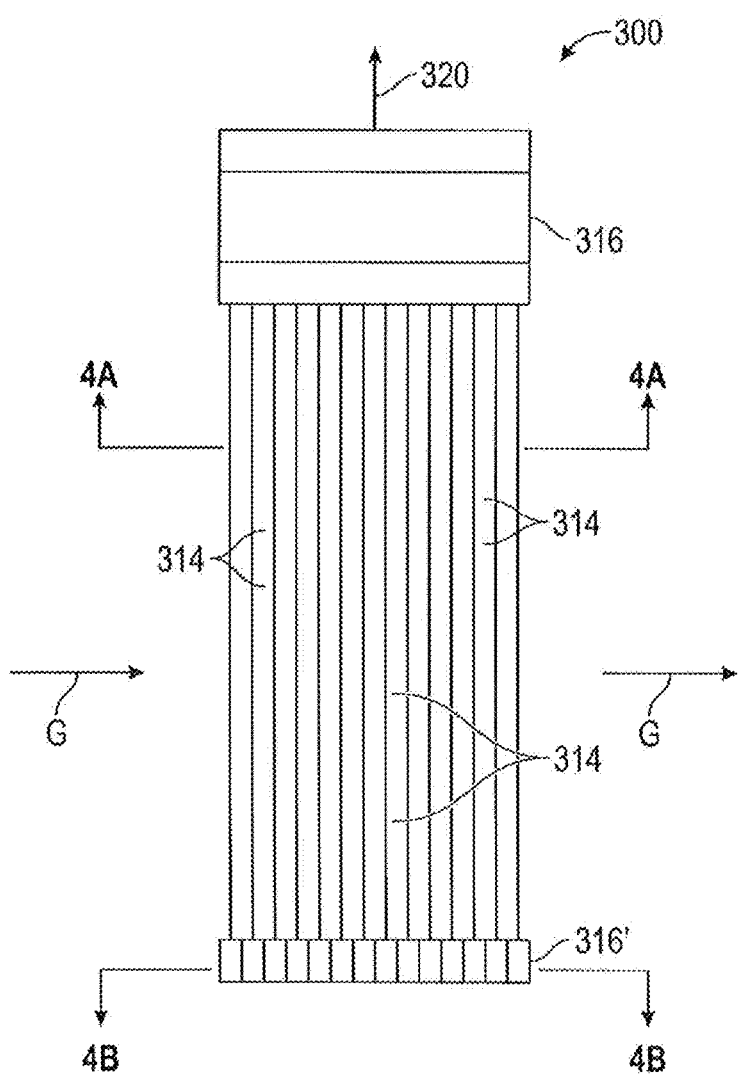

FIG. 4 depicts an embodiment of a draft (only) hollow fiber wig membrane unit wherein there is no shell enclosure having permeate flowing to a single tube sheet having a wig configuration having the tubes blocked on one end of the hollow fiber wig membrane unit for primary (first) stage draft bank only, and/oror any (primary, secondary, etc.) stage pressurized bank embodiment of a gas phase single or multistage bank(s) enrichment system of the present invention.

Figure 4A:
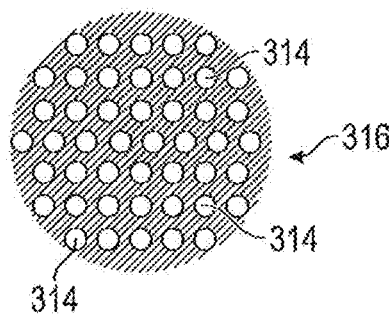

FIG. 4A is a sectional view along line 4A-4A of FIG. 4.

Figure 4B:
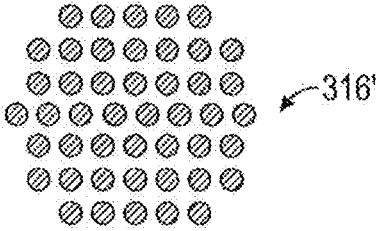

FIG. 4B is a sectional view along line 4B-4B of FIG. 4.

Figure 4C:
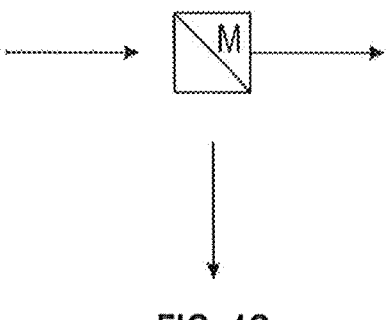

FIG. 4C is a schematic depiction of a generalized embodiment of a draft membrane unit which includes the embodiment of the draft hollow fiber wig membrane unit depicted in FIG. 4.

FIG. 5 depicts an embodiment of a draft or pressurized sheet membrane unit having permeate flowing into slotted or perforated pipe from permeate channels of the sheet membrane unit for primary (first) stage draft bank only, and/or any (primary, secondary, etc.) stage pressurized bank which may be utilized in single or multistage pressurized bank(s) embodiment of a gas phase enrichment system of the present invention.

FIG. 5A is a schematic depiction of the individual membrane and spacer sheets of the sheet membrane unit of FIG. 5.

FIG. 5B is a schematic depiction of a generalized embodiment of a draft membrane unit which includes the embodiment of the draft (only) sheet membrane unit depicted in FIG. 5.

FIG. 6 depicts an embodiment of a pressurized spiral wound (sheet) membrane unit having permeate flowing into a central slotted or perforated pipe from permeate channels of the pressurized spiral wound (sheet) membrane unit for any (primary, secondary, etc.) stage pressurized bank which may be utilized in single or multistage pressurized bank(s) of an embodiment of a gas phase enrichment system of the present invention.

FIG. 6A schematically depicts the individual membrane and spacer sheets of the pressurized spiral wound (sheet) membrane unit of FIG. 6.

FIG. 6B is a schematic depiction of a generalized embodiment of a pressurized membrane unit which includes the embodiment of the pressurized spiral wound (sheet) membrane unit depicted in FIG. 6.

8

Figures 7, 7A:
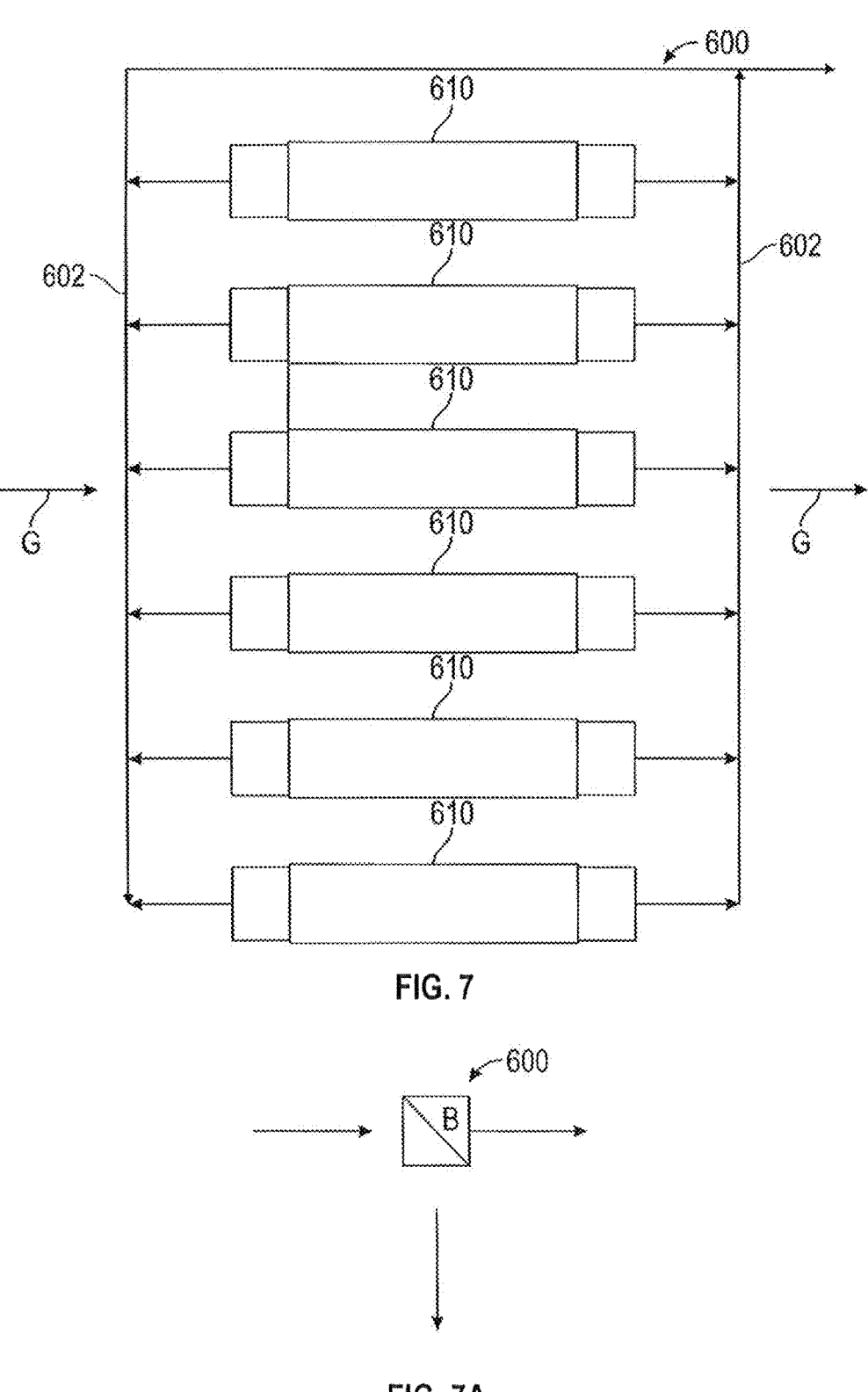

FIG. 7 depicts an embodiment of a draft membrane bank of draft (only) membrane units having the general configuration of the draft (only) membrane units depicted in FIGS. 2 and/or 3 herein for a primary (first) stage draft bank only of a gas phase single or multistage bank(s) enrichment system of the present invention.

FIG. 7A is a schematic depiction of a generalized embodiment of a draft (only) membrane bank including the embodiment of the draft membrane bank depicted in FIG. 7.

Figure 8:
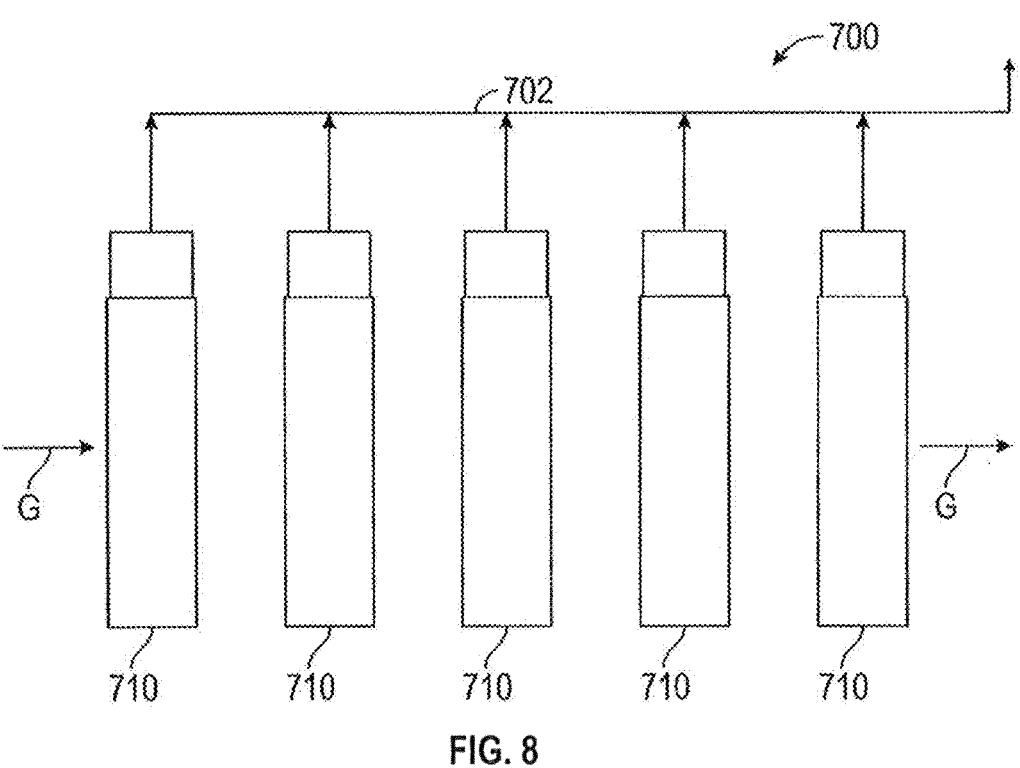

FIG. 8 depicts an embodiment of a draft membrane bank of draft (only) membrane units having the general configuration of the draft membrane units depicted in FIGS. 4 and/or 5 herein for a primary (first) stage draft bank only of a gas phase single or multistage bank(s) enrichment system of the present invention.

Figure 8A:
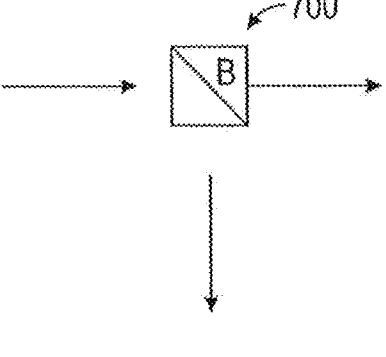

FIG. 8A is a schematic depiction of a generalized embodiment of a draft membrane bank including the embodiment of the draft membrane bank depicted in FIG. 8.

Figure 9:
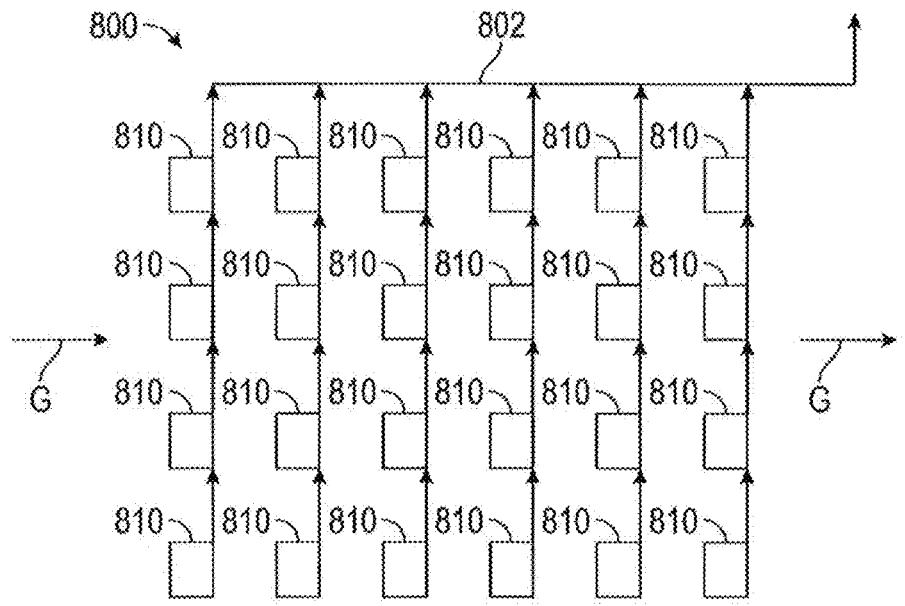

FIG. 9 depicts an embodiment of a draft membrane bank of draft (only) membrane units having the general configuration of the draft membrane units depicted in FIGS. 2 and/or 3 and/or 4, and/or 5 herein for a primary (first) stage draft bank only of a gas phase single or multistage bank(s) enrichment system of the present invention.

Figure 9A:
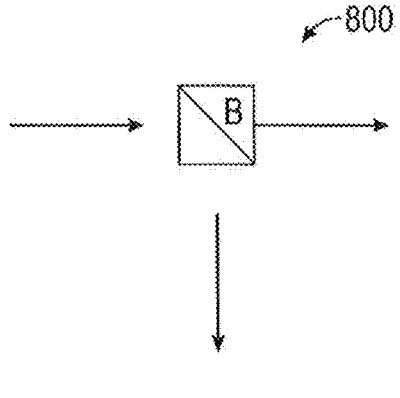

FIG. 9A is a schematic depiction of a generalized embodiment of a draft membrane bank including the embodiment of the draft membrane bank depicted in FIG. 9.

Figure 1:
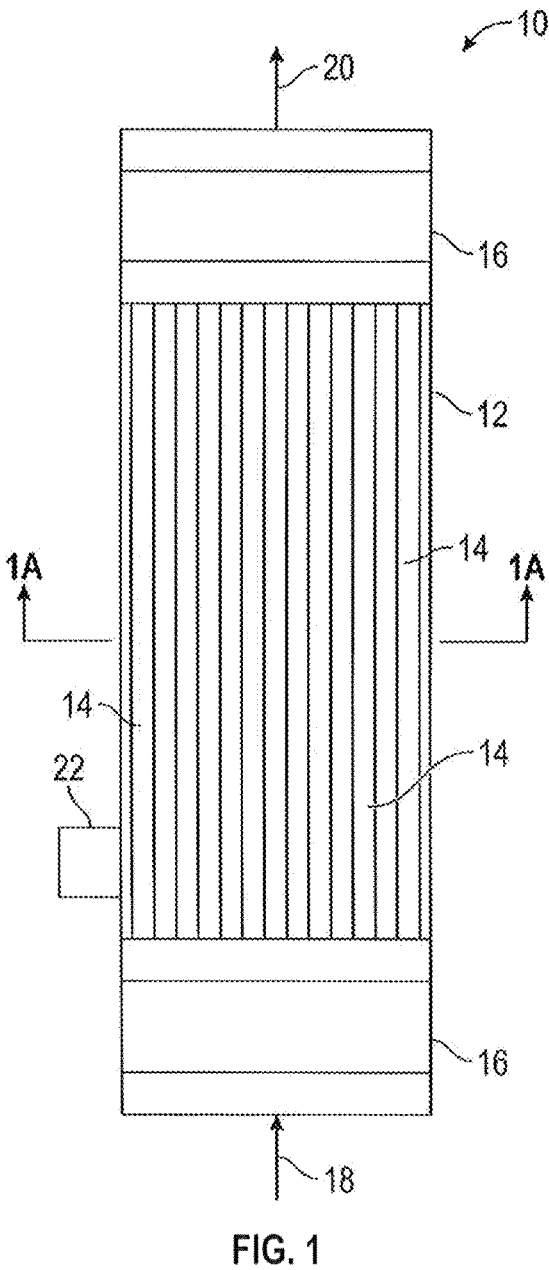
FIG. 1 depicts a prior art pressurized hollow fiber membrane unit with air "pressurized" into the feed tube sheet end of the membrane unit wherein the membrane tubes are fully enclosed (set) within a shell, with permeate flow to the shell nozzle of the membrane unit, for primary (first), secondary (second), or later (third, fourth, etc.) stage(s) bank(s) of an embodiment of a gas phase single or multistage bank(s) enrichment system of the present invention.
Figures 10, 10A:
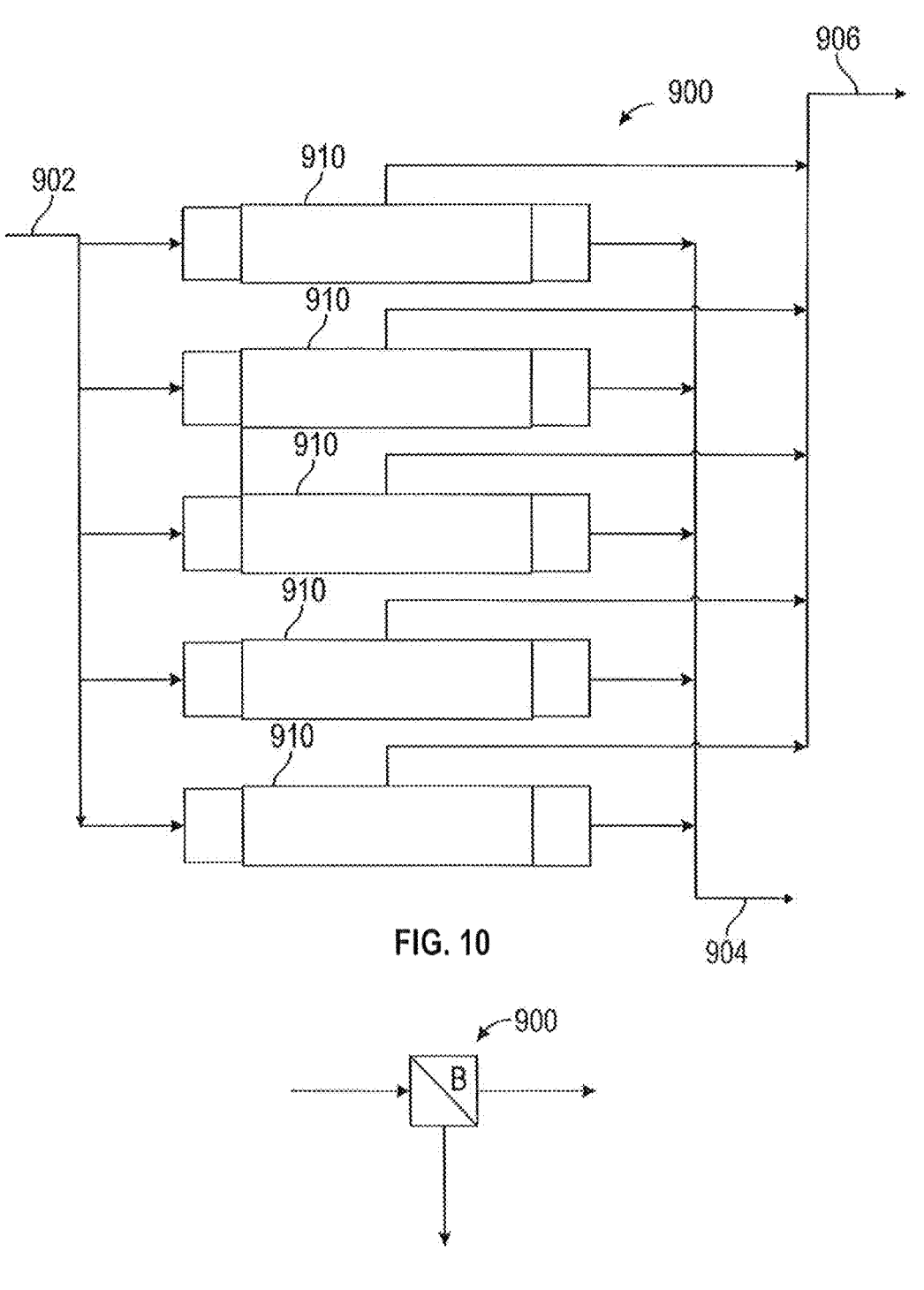

FIG. 10 depicts an embodiment of a pressurized membrane bank of membrane units utilized in any stage of a gas phase single or multistage bank(s) enrichment system, the pressurized membrane units including the embodiment of the pressurized membrane unit depicted in FIG. 1.

FIG. 10A is a schematic depiction of a generalized embodiment of a pressurized membrane bank including the embodiment of the pressurized membrane bank depicted in FIG. 10.

Figure 11:
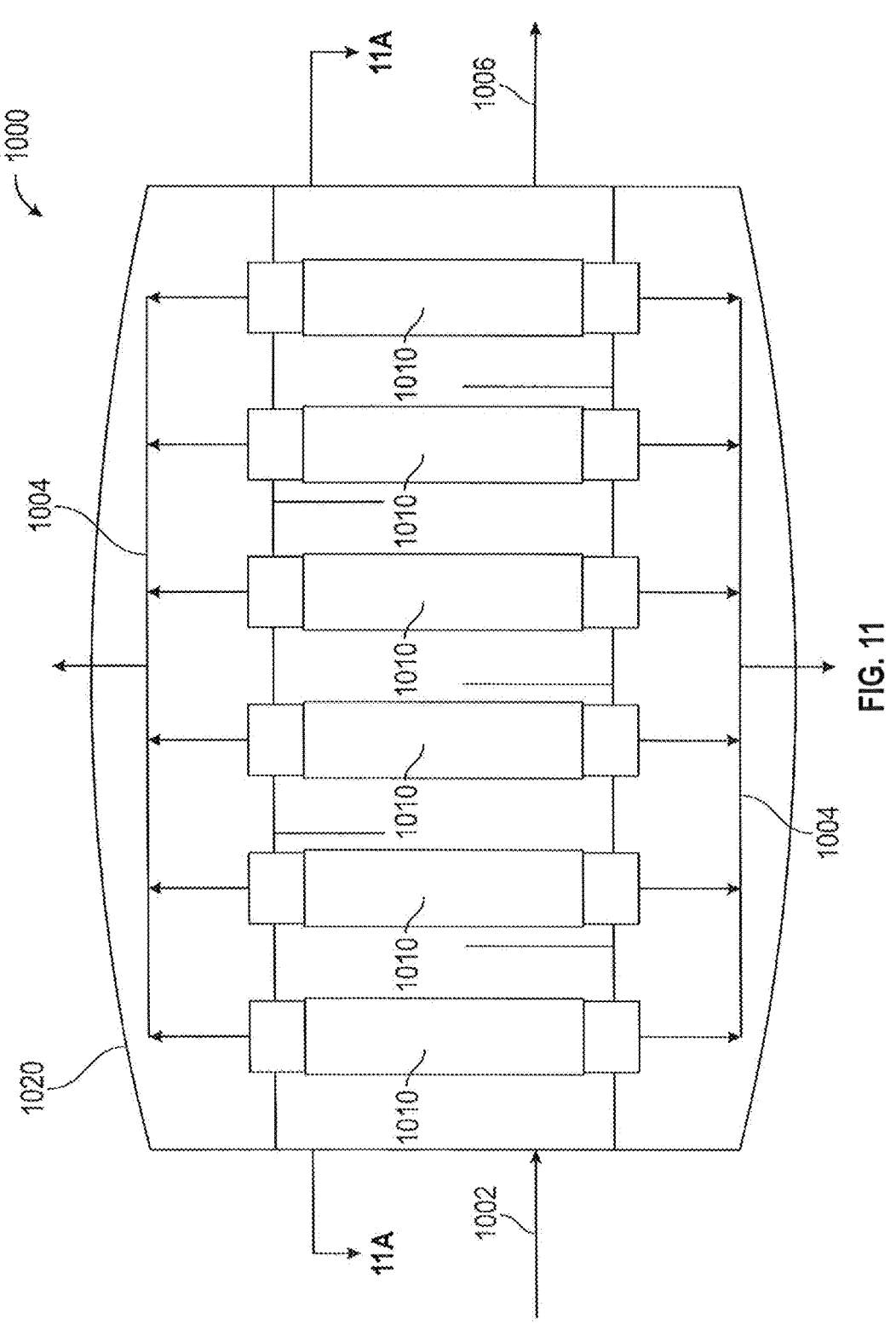

FIG. 11 depicts an embodiment of a pressurized membrane bank of membrane units utilized in any stage of a gas phase single or multistage bank(s) of an enrichment system, the pressurized membrane units including the embodiments of pressurized membrane units (only) depicted in FIGS. 2 and 3.

Figure 11A:
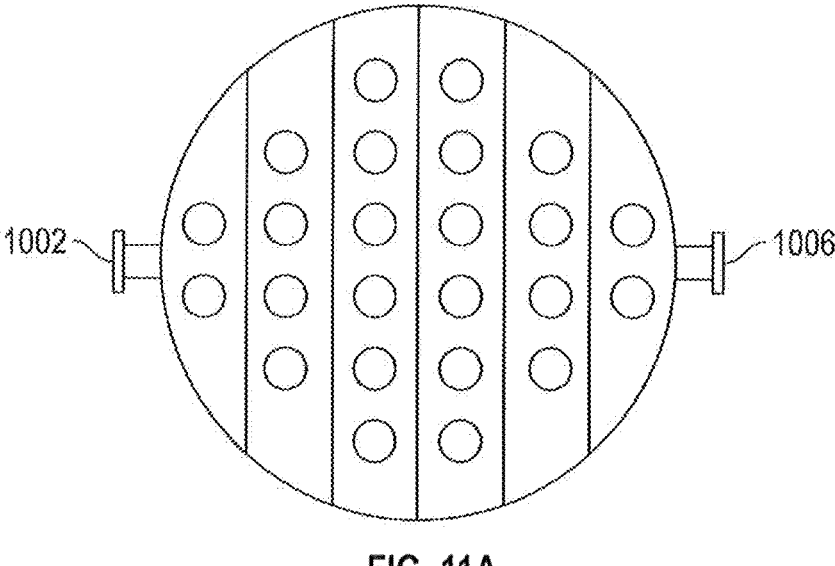

FIG. 11A is a sectional view taken along line 11A-11A of FIG. 11.

Figure 11B:
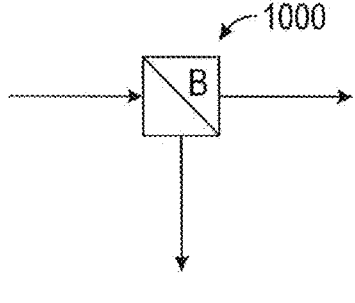

FIG. 11B is a schematic depiction of a generalized embodiment of a pressurized membrane bank including the embodiment of the pressurized membrane bank depicted in FIG. 11.

Figure 12:
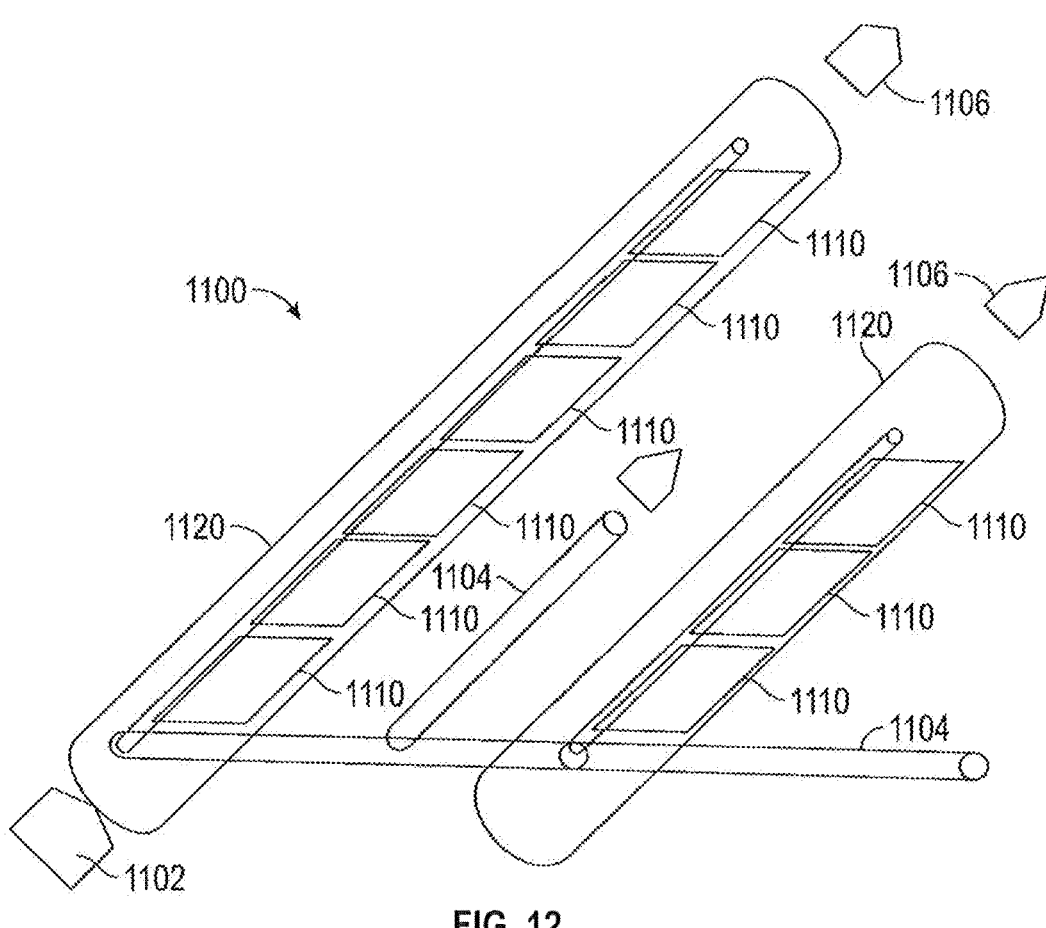

FIG. 12 depicts an embodiment of a pressurized membrane bank of membrane units utilized in any stage of a gas phase single or multistage bank(s) of an enrichment system, the pressurized membrane unit including the embodiment of pressurized membrane units (only) depicted in FIG. 5.

Figure 12A:
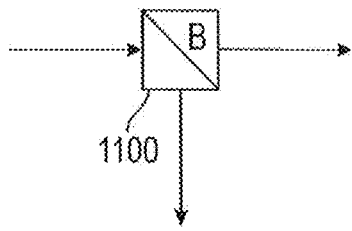

FIG. 12A is a schematic depiction of a generalized embodiment of a pressurized membrane bank including the embodiment of the pressurized membrane bank depicted in FIG. 12.

Figures 13, 13A:
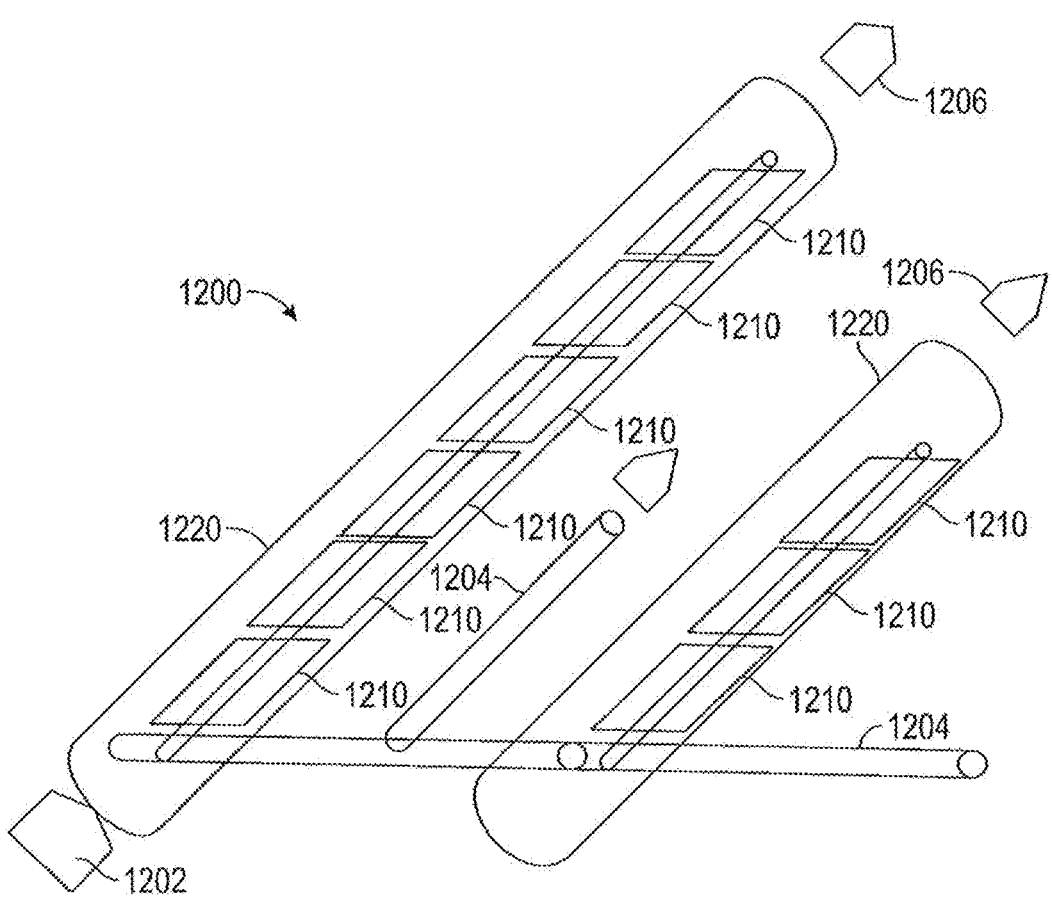

FIG. 13 depicts an embodiment of a pressurized membrane bank of pressurized membrane units utilized in any stage of a gas phase single or multistage bank(s) of an enrichment system, the pressurized membrane unit including the embodiment of pressurized membrane units depicted in FIG. 6.

Figures 14, 14A, 14B, 14C:
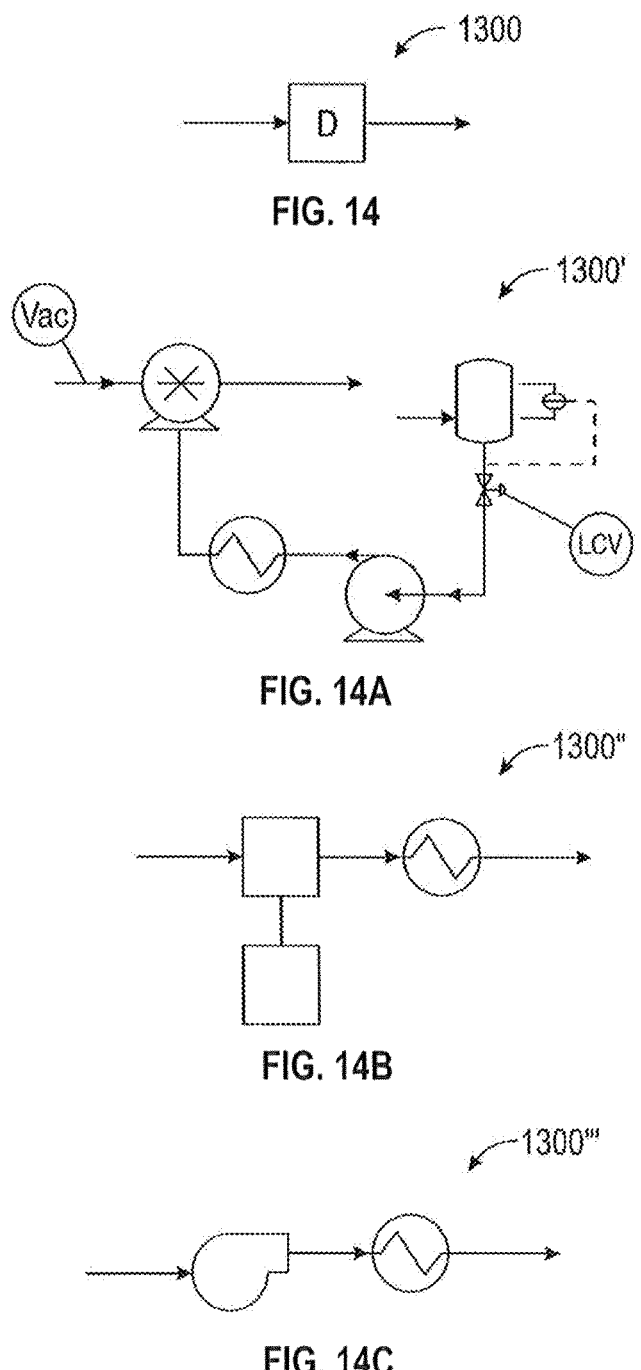

FIG. 14 schematically depicts a generalized pressure differential apparatus which may be utilized in embodiments of the disclosed system and process.

FIG. 14A depicts an embodiment a liquid ring vacuum pump system which may be utilized as a pressure differential apparatus in embodiments of the disclosed system and process to apply a vacuum.

FIG. 14B schematically depicts a reciprocating compressor which may be utilized as a pressure differential apparatus in embodiments of the disclosed system and process to apply a positive pressure.

FIG. 14C schematically depicts a centrifugal blower which may be utilized as a pressure differential apparatus in embodiments of the disclosed system and process to apply a positive pressure.

Figure 15:
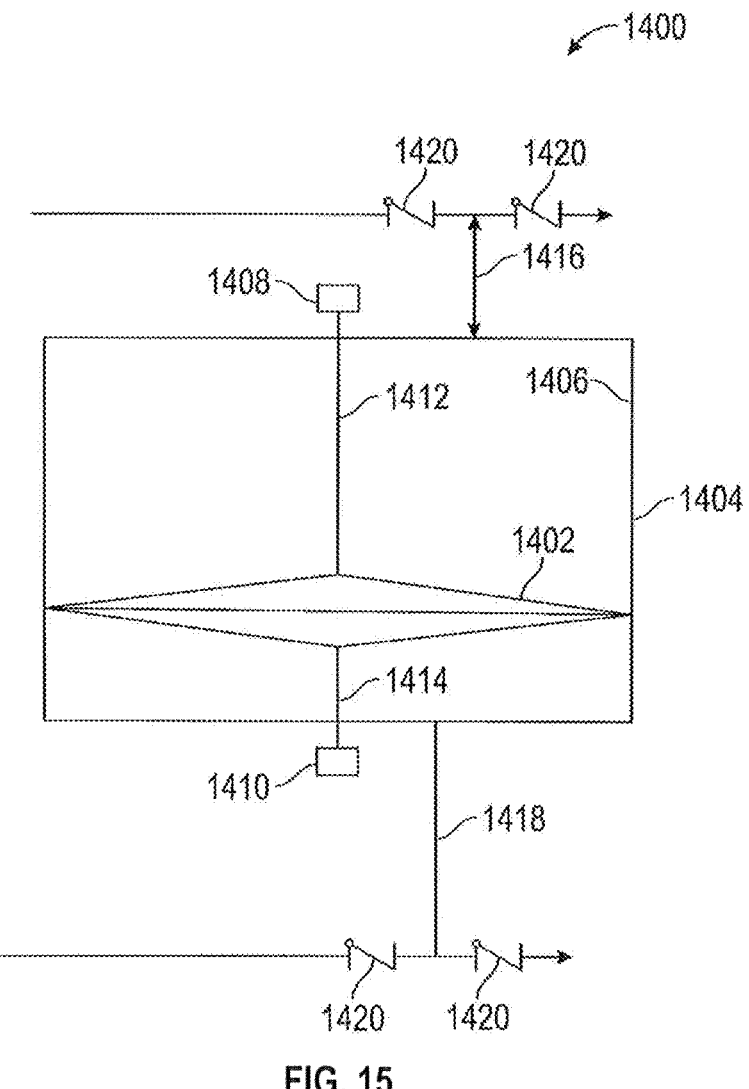

FIG. 15 depicts another embodiment of a pressure differential apparatus (bellows tank) which may be utilized in embodiments of the disclosed system and process.

Figure 15A:
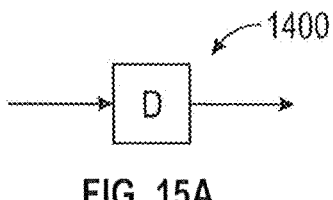

FIG. 15A is a schematic depiction of a generalized pressure differential apparatus which includes the embodiment depicted bellows tank in FIG. 15.

Figure 16:
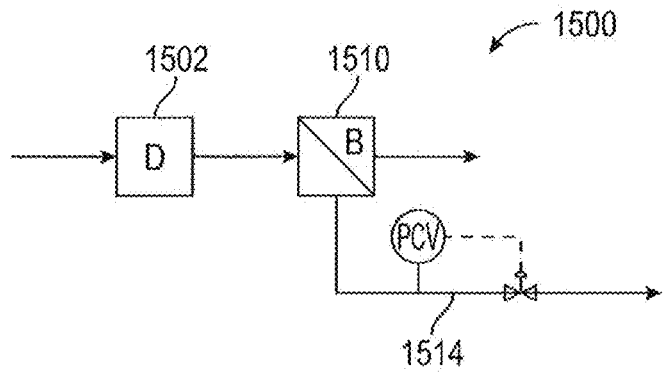

FIG. 16 schematically depicts a pressurized primary (1st stage) membrane bank system which may utilize membrane banks as depicted in FIGS. 10 through 13, the system having a pressure differential apparatus upstream of the pressurized membrane bank, the pressurized membrane bank system also having a pressure control apparatus on the residue stream.

Figure 17:
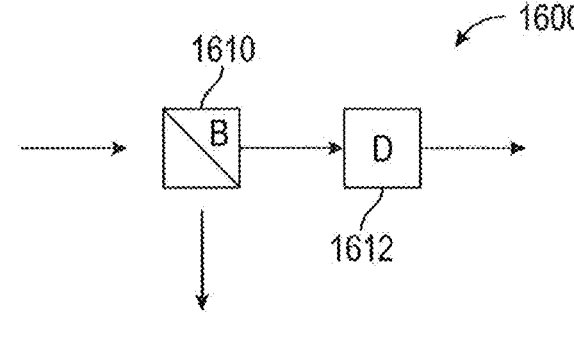

FIG. 17 schematically depicts a draft membrane bank system which may utilize membrane banks as depicted in FIGS. 7 through 9, the system having a pressure differential apparatus as depicted in FIGS. 14 through 15 downstream of the draft membrane bank.

Figure 18:
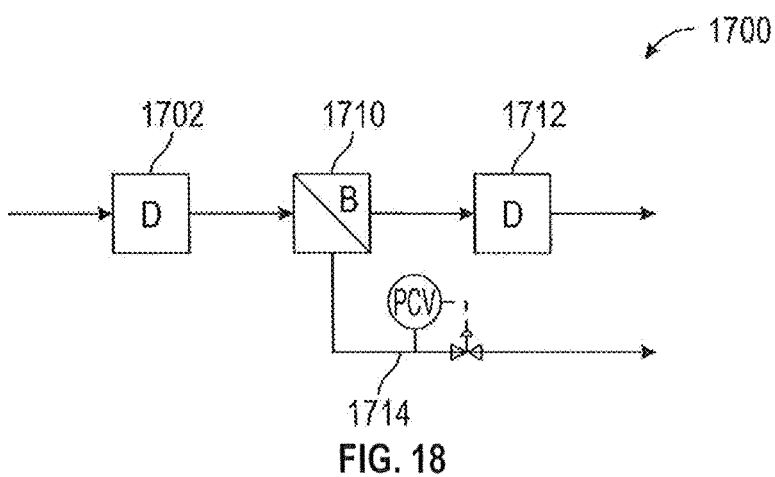

FIG. 18 schematically depicts a membrane bank as depicted in FIGS. 10 through 13 having a pressure differential apparatus on both the upstream and downstream sides of the membrane bank, the membrane bank further comprising a pressure controlled residue stream.

FIG. 19 schematically depicts a two stages enrichment system with both stages having pressurized membrane banks as depicted in any of FIGS. 10 through 13 configured as pressurized membrane bank systems depicted in either FIG. 16 or 18.

FIG. 20 schematically depicts a two stages enrichment system with the first stage system configured as a draft membrane bank system as depicted in FIG. 17 and the second stage configured as a pressurized membrane bank system from in either FIG. 16 or 18.

FIG. 21 schematically depicts three stages of an enrichment system with the first two stages configured as in FIG. 19 with the third stage comprising a recycled residue stream to the intake of the second stage.

FIG. 21A schematically depicts the three stages of an enrichment system depicted in FIG. 21, but also comprising a dessicant or refrigeration apparatus between the first and second stage configured to provide water removal from the gas prior to entry into the second stage as well as provide a pressure driver for an optional outlet stream of permeate.

FIG. 22 schematically depicts three stages of an enrichment system with the first two stages configured as the system depicted in FIG. 20, with the third stage comprising a pressurized membrane bank system as depicted in FIG. 16 or 18 comprising a recycled residue stream to the intake of the second stage.

FIG. 22A schematically depicts the three stages of an enrichment system depicted in FIG. 22, but also comprising a dessicant or refrigeration gas drying apparatus between the first and second stage configured to provide water removal from the gas prior to entry into the second stage as well as provide a pressure driver for an optional outlet stream of permeate.

Figure 23:
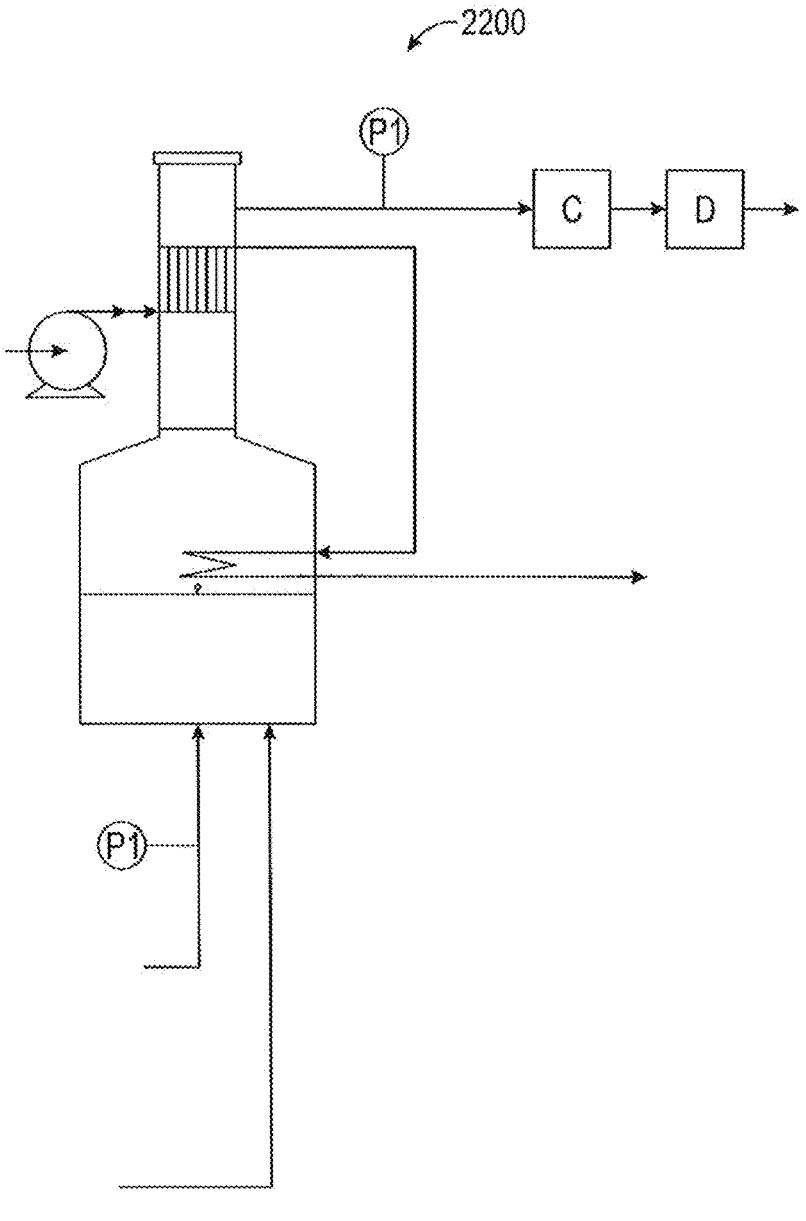

FIG. 23 schematically depicts a flue gas generator with conventional combustion air feed and fuel gas, having a cooling apparatus and a gas driver apparatus on the flue gas.

Figure 24:
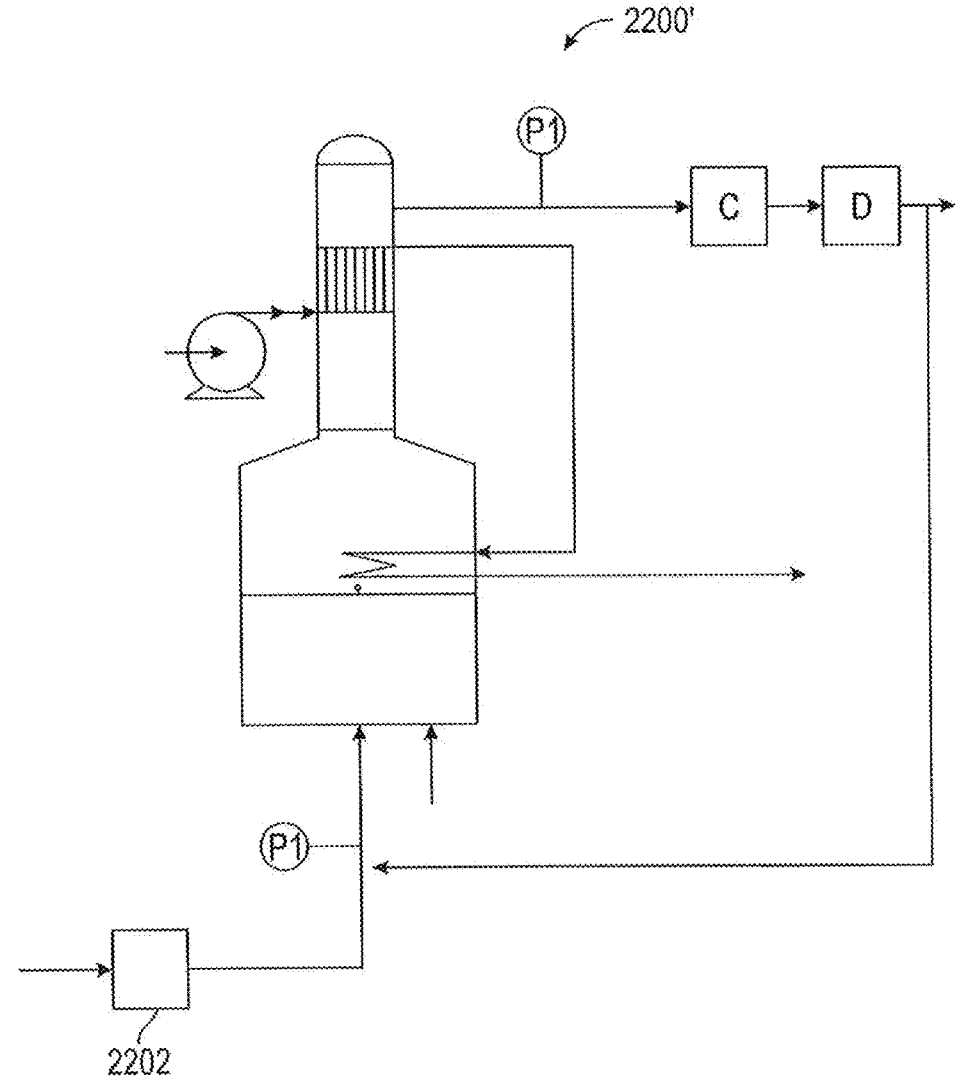

FIG. 24 schematically depicts the flue gas generator of FIG. 23 to which any of the systems depicted in FIGS. 16 through 22 may be utilized to enrich the combustion air to the burner.

Figure 25:
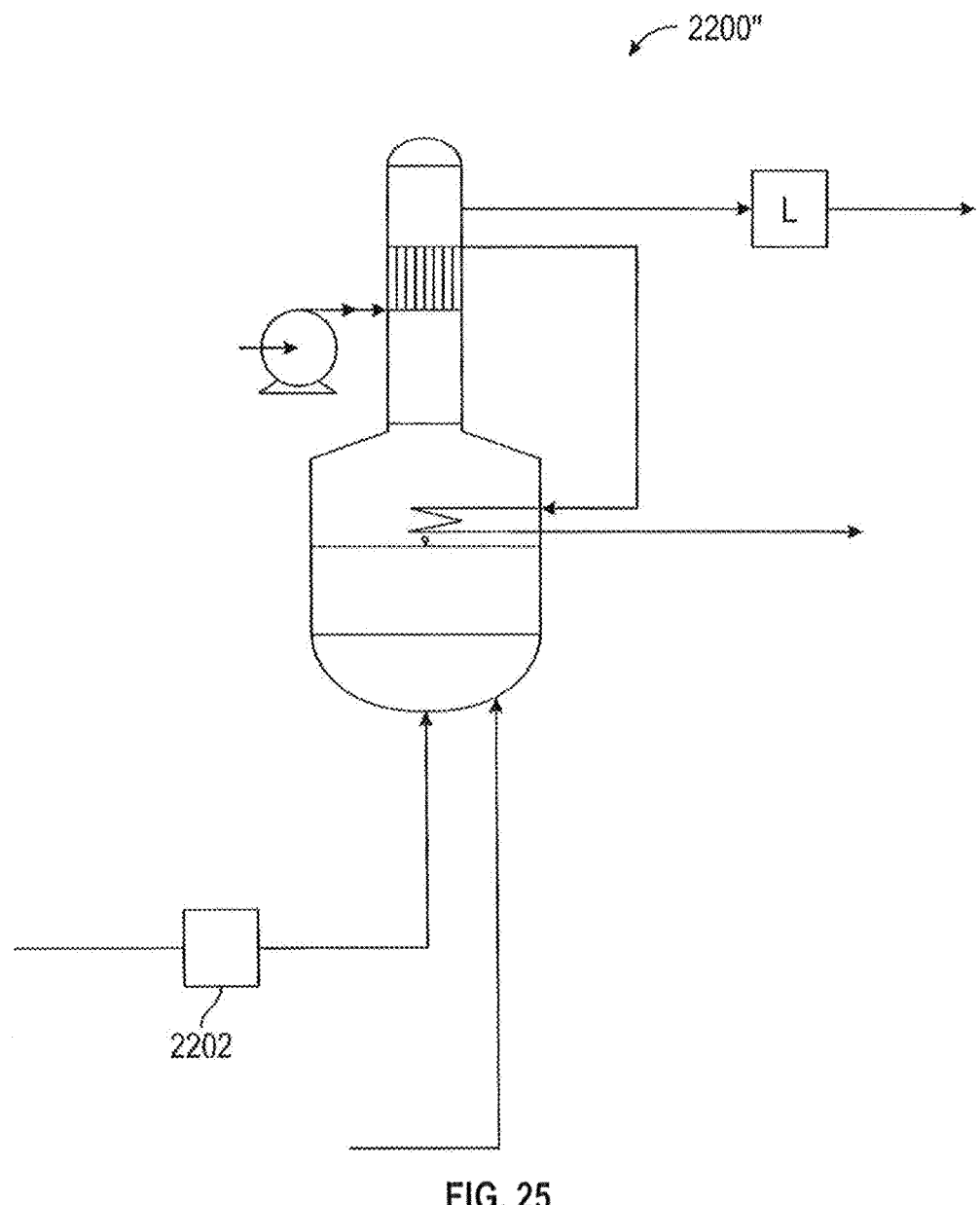

FIG. 25 schematically depicts a pressurized flue gas generator with recycled and cooled flue gas to flue gas feed to which any of the systems depicted in FIGS. 16 through 22 may be utilized to enrich the combustion air to the burner.

Figure 26:
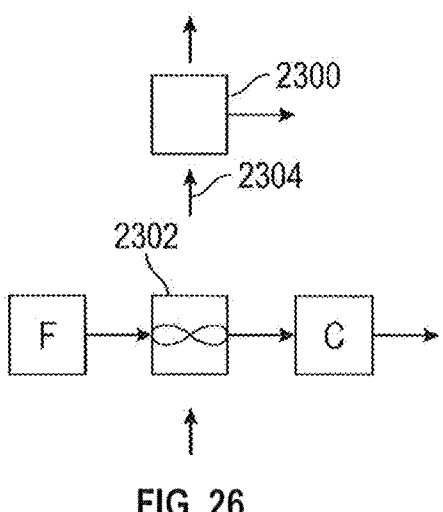

FIG. 26 schematically depicts a draft membrane bank disposed at an air cooler fan discharge for improving draft membrane unit performance, the draft membrane bank unit being any those as depicted in FIGS. 7 through 9.

Figure 27:
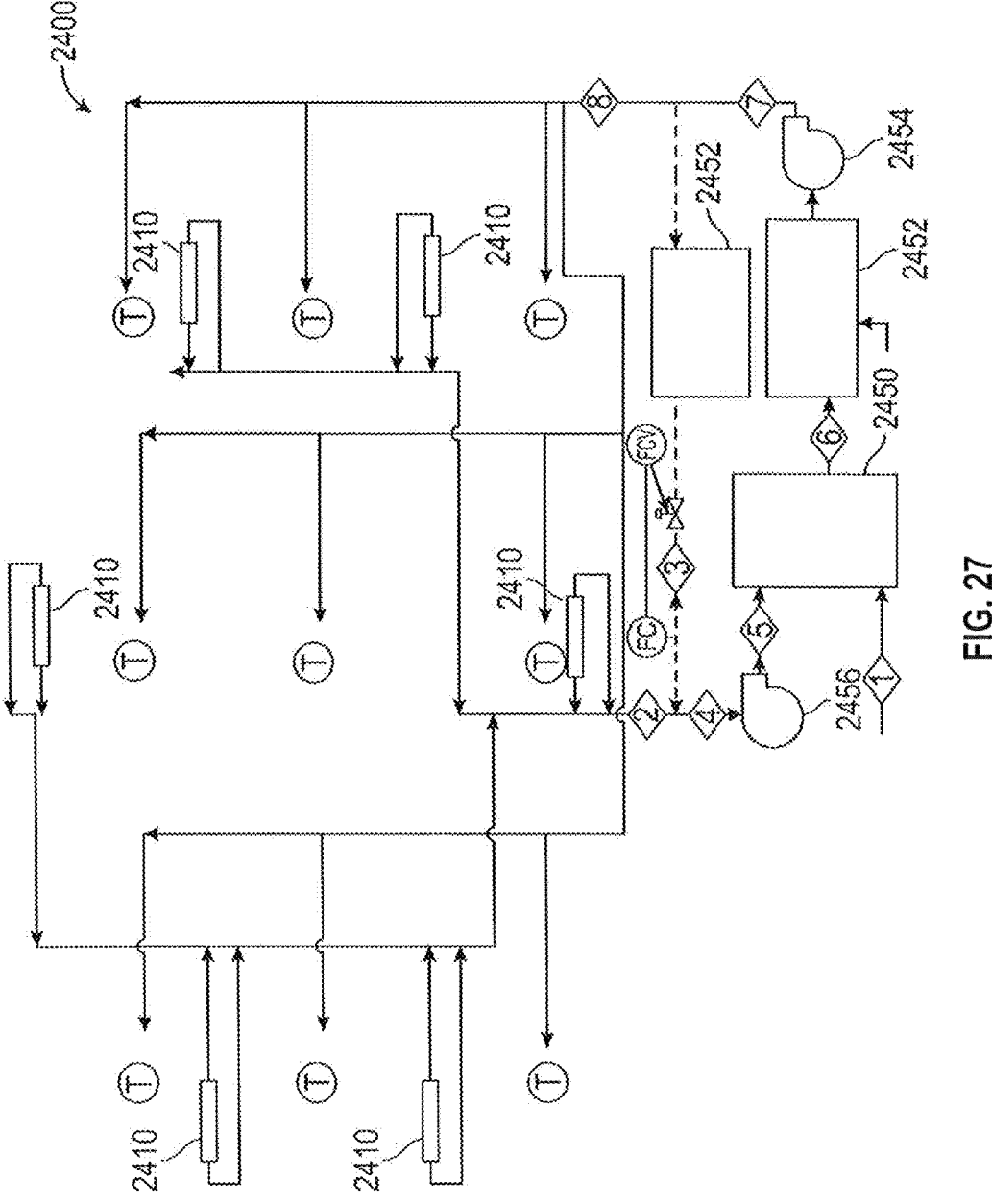

FIG. 27 depicts a membrane system with a flue gas generator (mobile or stationary) which may be utilized in providing an enriched stream of carbon dioxide in an agricultural application.

DETAILED DESCRIPTION OF THE EMBODIMENTS

Figure 1A:
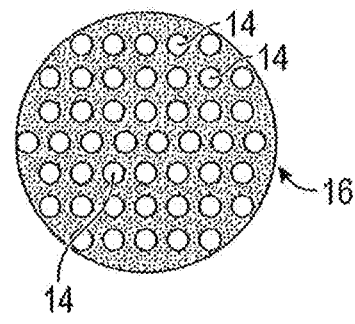
FIG. 1A is a sectional view along line 1A-1A of FIG. 1.
Figure 1B:
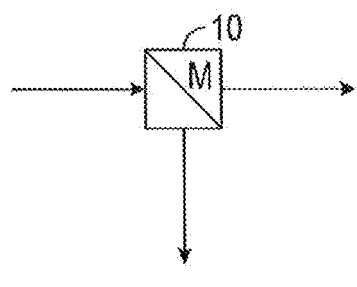
FIG. 1B is a schematic depiction of a "pressurized" membrane unit including the membrane unit depicted in FIG. 1 which is utilized in other embodiments and figures of the present disclosure.

Referring now to the Figures, FIGS. 1, 1A and 1B depict a prior art configuration of a hollow fiber membrane unit 10. Membrane unit 10 has a membrane housing 12 comprising a plurality of hollow fiber membrane tubes 14, where the wall of each of the hollow fiber membrane tubes is a selective barrier through which certain components readily pass through and other components do not. The membrane unit 10 has tube sheets 16 at each of the ends of the membrane unit, which bind the outer walls of the hollow fiber tubes to each other and support the tube bundle within the membrane housing 12. An inlet 18 is at one end of the membrane unit 14 and an outlet 20 is at the other end.

Gas having an initial composition comprising both fast gas components and slow gas components enters the membrane unit 10 through inlet 18, with the fast gas components permeating the selective barrier of the tube walls more readily than the slow gas components. A residue gas exits the membrane unit 14 through outlet 20 and a permeate stream exists the membrane unit through permeate nozzle 22. The residue gas has, on a per volume basis, a reduced concentration of the faster gas components and an enriched concentration of the slower gas components. Likewise, the permeate stream has, on a per volume basis, a reduced concentration of the slower gas components and an increased concentration of fast gas components. This configuration of a hollow fiber membrane unit 10 receives the gas through the inlet 18 under pressure and membrane housing (or shell) 12 is necessary to contain the pressurized gas and to support the membrane tubes 14. It is to be appreciated that housing 12 is relatively heavy and it adds to the weight and expense of the membrane unit 10.

FIGS. 2, 2A and 2B depict a membrane unit 100 of the present invention having a "wig" configuration which may be utilized in an open air (i.e., "draft") application. As discussed above, "wig" configuration refers to a construction comprising a plurality of individual hollow fiber membrane elements 114 which all pass a gas permeate into a common end of the membrane elements. Membrane unit 100 has the same hollow fiber membrane tubes 114, such that the fast gas components passing more readily through the selective barrier of the walls of tubes 114 than the slow gas components. In contrast to the prior art membrane unit 10, membrane unit 100 has no housing 12 and does not have a discrete inlet comparable to that of inlet 18 of the prior art membrane unit 10. Instead, the exteriors of tubes 114 are exposed to gas G of an ambient environment. In one of the embodiments of the present invention fast gas components preferentially flow through the selective barrier of each membrane tube 114, with permeate gas flowing out through permeate outlets 120. Gas components making up a "residue" stream simply comprise those components which do not pass through the walls of the membrane tubes 114 flowing past the membrane unit 100. Membrane unit 100 comprises tubesheets 116, which will be substantially lighter than tube sheets 16 of the prior art membrane unit 10 thereby saving on weight and expense.

Gas G may comprise ambient air having a concentration of oxygen, nitrogen, carbon dioxide and water vapor. For the selective barrier of the hollow fiber membrane elements of the present invention, oxygen, carbon dioxide and water vapor are considered to be "fast gas" components and nitrogen is a "slow gas" component. Thus, in one embodiment of the invention, a membrane unit 100 disposed in an environment of ambient air will produce a permeate having an enriched concentration of oxygen, carbon dioxide and water vapor where the permeate will also have a depleted concentration of nitrogen.

FIGS. 3, 3A, 3B depict a membrane unit 200 of the present invention depicts an embodiment of a draft or pressurized hollow fiber wig membrane unit having a wig configuration having permeate flowing to both hollow fiber membrane tube sheets 216. Similar to membrane unit 100, membrane unit 200 comprises a plurality of hollow fiber membrane tubes 214 with each tube having a selective barrier wall which, in some embodiments of the invention, passes fast gas components to the interior of each tube more readily than slow gas components. The resulting permeate having a higher concentration of fast gas components than the ambient gas G flows to the outlets 220 adjacent tube sheets 216. However, in contrast to the embodiments of the membrane unit depicted in FIGS. 2 and 2A, membrane unit 200 is set within a perforated shell 212, thereby providing additional support and containment for the hollow fiber membrane tubes 214.

FIGS. 4, 4A and 4B depict an embodiment of a draft (only) hollow fiber wig membrane unit 300 having no shell or enclosure and having permeate flowing to a single tube sheet 316. In this embodiment of the membrane unit 300, hollow fiber tubes 314 have one end of each of the hollow fiber tubes 314 blocked with plug sheet 316' which collectively blocks all of the tubes or each tube may be individually plugged or capped. Similar to membrane units 100 and 200, membrane unit 300 comprises a plurality of hollow fiber membrane tubes 314 with each tube having a selective barrier wall which, in some embodiments of the invention, passes fast gas components to the interior of each tube more readily than slow gas components. The resulting permeate has a higher concentration of fast gas components than the ambient gas G flows to the outlet 320 adjacent the tube sheet 316.

FIGS. 5, 5A and 5B depict an embodiment of a draft or pressurized sheet membrane unit 400 having permeate flowing into slotted or perforated pipe from permeate channels of the sheet membrane unit for primary (first) stage draft bank only, and/or any (primary, secondary, etc.) stage pressurized bank which may be utilized in single or multistage pressurized bank(s) embodiment of a gas phase enrichment system of the present invention. Membrane unit 400 has a slotted collection pipe 424 having a permeate collection pipe slot 426. A sheet membrane element 428 may have a top membrane sheet 430 and a bottom membrane sheet 432 glued only on three sides to a ribbed sheet 434, where a top permeate channel is defined between the top membrane sheet 430 and the ribbed sheet 434 and a bottom permeate channel is defined between the bottom membrane sheet 432 and the ribbed sheet 434. The fourth side of sheet membrane element is not glued comprising open ends of top and bottom membrane elements which extend over the permeate collection pipe slot 426.

FIGS. 6, 6A and 6B depict an embodiment of a pressurized spiral wound (sheet) membrane unit 500. In this embodiment of the membrane unit 50 feed enters into the front face 502 of each unit and the residue stream leaves the rear face 504 of each unit. Spiral wound membrane unit 500 is fabricated from alternating sheets of membrane sheets, each comprising a selective barrier, and spacer sheets. FIG. 6A shows an expanded detail of an unwound membrane unit, where the spiral membrane unit has the following elements: (1) a bottom feed/residue spacer 506; (2) a bottom membrane sheet 508; (3) a permeate spacer 510; (4) a top membrane sheet 512; (5) a top feed/residue spacer 514; (6) a bottom feed/residue channel 516; (7) a bottom feed permeate channel 518; (8) a top permeate channel 520; and (9) a top feed/residue channel 522. The membrane sheet layers 508, 512 are glued to the feed/residue spacers 506, 514 at the front edges only and glued to the permeate spacer 510 at the front and the side edges. The open ends of permeate channels 518, 520 are attached over perforations 526 in a permeate collection pipe 528. The top fee/residue spacer 514 is longitudinally ribbed on the bottom of the spacer and the bottom feed/residue spacer 506 is longitudinally ribbed on the top of the spacer. Permeate spacer 510 is laterally ribbed on the top and bottom of the spacer.

Gas flows in a spiral pattern through the spiral wound membrane unit 500 with the permeate received by permeate collection pipe 528. The ends of permeate collection pipe 528 may be threaded so that the spiral wound membrane units 500 may be attached in end-to-end configuration for collection of the permeate. An assembly of multiple spiral wound membrane units 500 may be connected to a permeate collection header.

FIGS. 7, 7A depict an embodiment of a draft membrane bank 600 of draft (only) membrane units 610 having the general configuration of the membrane units 100, 200 described above and depicted in FIGS. 2 and/or 3 or the like. Draft membrane bank 600 is utilized as a primary (first) stage draft bank only of a gas phase single or multistage bank(s) enrichment system of the present invention. The exteriors of the banked membrane units 610 are exposed to gas G of an ambient environment. Fast gas components preferentially flow through the selective barrier of each membrane unit with permeate gas flowing out and collected through permeate headers 602 and directed to a permeate processing facility, which may include a second stage of enrichment, a flue gas generator or to a carbon dioxide sequestering facility.

FIGS. 8, 8A depict an embodiment of a draft membrane bank 700 of draft (only) membrane units 710, which may include membrane units 300, 400 described above and depicted in FIGS. 4 and/or 5 or the like. Draft membrane bank 700 is utilized for a primary (first) stage draft bank only of a gas phase single or multistage bank(s) enrichment system of the present invention. The exteriors of the banked membrane units 710 are exposed to gas G of an ambient environment. Fast gas components preferentially flow through the selective barrier of each membrane unit 710 with permeate gas flowing out and collected through permeate header 702 and directed to a permeate processing facility, which may include a second stage of enrichment, a fl*9ue* gas generator or to a carbon dioxide sequestering facility.

FIGS. 9, 9A depict an embodiment of a draft membrane bank 800 of draft (only) membrane units 810, which may include membrane units 100, 200, 300, 400 described above and depicted in depicted in FIGS. 2 and/or 3 and/or 4, and/or 5 or the like. Draft membrane bank 800 is utilized for a primary (first) stage draft bank only of a gas phase single or multistage bank(s) enrichment system of the present invention. The exteriors of the banked membrane units 810 are exposed to gas G of an ambient environment. Fast gas components preferentially flow through the selective barrier of each membrane unit 810 with permeate gas flowing out and collected through permeate header 802 and directed to a permeate processing facility, which may include a second stage of enrichment, a flue gas generator or to a carbon dioxide sequestering facility.

FIGS. 10, 10A depict an embodiment of a pressurized membrane bank 900 of pressurized membrane units 910 utilized in any stage of a gas phase single or multistage bank(s) enrichment system. The pressurized membrane units 910 may include embodiments of the pressurized membrane unit 10 depicted in FIG. 1. Pressurized bank 900 receives a stream of gas through inlet header 902 and may discharge the resulting permeate gas through permeate outlet header 904 and may discharge residual gas through residual outlet header 906. Permeate outlet header 904 may direct the permeate to a permeate processing facility, which may include a further stage of enrichment, a flue gas generator or to a carbon dioxide sequestering facility. Residual outlet header 906 may appropriately discharge or recycle the residual gas stream.

FIGS. 11, 11A, 11B depicts an embodiment of a pressurized membrane bank 1000 of membrane units 1010. Membrane units 1010 utilized in pressurized membrane bank 1000 may include embodiments of the membrane units 100, 200 described above and depicted in FIGS. 2 and 3. Pressurized membrane bank receives a stream of gas through inlet 1002 and may discharge the resulting permeate gas through permeate outlet headers 1004 and may discharge residual gas through outlet 1006. Permeate outlet headers 1004 may direct the permeate to a permeate processing facility, which may include a further stage of enrichment, a flue gas generator or to a carbon dioxide sequestering facility. Outlet 1006 may appropriately discharge or recycle the residual gas stream. Membrane units 1010 are contained within a shell 1020. Pressurized membrane bank 1000 may be utilized in any stage of a gas phase single or multistage bank(s) of an enrichment system.

FIGS. 12, 12A depict an embodiment of a pressurized membrane bank 1100 of membrane units 1110. Membrane units 1110 utilized in pressurized membrane bank 1100 may include embodiments of the membrane units 400 described above and depicted in FIG. 5. Pressurized membrane bank 1100 receives a stream of gas through inlet 1102 and may discharge the resulting permeate gas through permeate outlet headers 1104 and may discharge residual gas through residual outlets 1106. Permeate outlet headers 1104 may direct the permeate to a permeate processing facility, which may include a further stage of enrichment, a flue gas generator or to a carbon dioxide sequestering facility. Residual outlets 1106 may appropriately discharge or recycle the residual gas stream. Membrane units 1110 are contained within a shell 1120 which may include low pressure ducting. Pressurized membrane bank 1100 may be utilized in any stage of a gas phase single or multistage bank(s) of an enrichment system.

FIGS. 13, 13A depict an embodiment of a pressurized membrane bank 1200 of membrane units 1210. Membrane units 1210 utilized in pressurized membrane bank 1200 may include embodiments of the membrane units 500 described above and depicted in FIG. 6. Pressurized membrane bank 1200 receives a stream of gas through inlet 1202 and may discharge the resulting permeate gas through permeate outlet headers 1204 and may discharge residual gas through residual outlets 1206. Permeate outlet headers 1204 may direct the permeate to a permeate processing facility, which may include a further stage of enrichment, a flue gas generator or to a carbon dioxide sequestering facility. Residual outlets 1206 may appropriately discharge or recycle the residual gas stream. Membrane units 1210 are contained within a shell 1220 which may include low pressure ducting. Pressurized membrane bank 1200 may be utilized in any stage of a gas phase single or multistage bank(s) of an enrichment system.

FIG. 14 schematically depicts a generalized pressure differential apparatus 1300. which may be utilized in embodiments of the disclosed system and process to provide pressure or vacuum to the selective barriers of the various disclosed membrane units discussed above. FIG. 14A schematically depicts a pressure differential apparatus 1300' comprising a liquid ring vacuum pump system which is one embodiment of differential pressure apparatus which may be utilized. comprising a liquid ring vacuum pump system. FIG. 14B schematically depicts a pressure differential apparatus 1300" comprising a reciprocating compressor system which may be utilized as a pressure differential apparatus in embodiments of the disclosed system and process to apply a positive pressure. FIG. 14C schematically depicts a pressure differential apparatus 1300''' comprising a centrifugal blower system which may be utilized as a pressure differential apparatus in embodiments of the disclosed system and process to apply a positive pressure.

Another embodiment of a pressure differential apparatus is depicted in FIGS. 15, 15A. This embodiment of pressure differential apparatus comprises a bellows tank 1400. Bellows tank 1400 may have a double-acting piston 1402 set within a large cylinder 1404. Piston 1402 may have graphite rings and/or the cylinder walls 1406 may comprise graphite. Actuation devices 1408, 1410 respectively utilize connectors 1412, 1414 to actuate piston 1402 in either direction within the cylinder 1404. It is to be appreciated that large cylinder 1404 need not be a pressure vessel and that actuation devices 1408, 1410 may be small winches driven by small motors and connectors 1412, 1414 may be light rods or small diameter cables. Double-acting piston 1402 may be diamond-shaped to provide additional structural integrity under vacuum conditions. Bellows tank 1400 applies vacuum to a connected membrane unit on each upstroke, relative to the position of intake/discharge lines 1416, 1418 which are connected to the membrane units, with an upstroke causing permeate to be pulled into cylinder 1404 through the intake/discharge line receiving vacuum on the upstroke. On each downstroke permeate is pushed out of the cylinder 1404 through intake/discharge lines 1416, 1418, with the flow direction controlled by the action of check valves 1420.

FIG. 16 schematically depicts a pressurized primary (1st stage) membrane bank system 1500 comprising a pressurized membrane bank 1510. The pressurized membrane bank 1510 may comprise embodiments of pressurized membrane banks 900, 1000, 1100, 1200 described above and depicted in FIGS. 10 through 13. Membrane bank system 1500 has a pressure differential apparatus 1502 upstream of the pressurized membrane bank, where the pressure differential apparatus may comprise the various embodiments depicted in FIG. 14 (including 14A, 14B and 14C) and the bellows tank 1400 depicted in FIG. 15. The pressurized membrane bank 1500 may also have a pressure control apparatus 1514 on the residue stream.

FIG. 17 schematically depicts a draft membrane bank 1600 system comprising a a membrane bank 1610. Membrane bank 1610 may comprise membrane banks 600, 700, and 800 described above and depicted in FIGS. 7 through 9. Membrane bank system 1600 has a pressure differential apparatus 1612 downstream of the pressurized membrane bank 1610, where the pressure differential apparatus may comprise the various embodiments depicted in FIG. 14 (including 14A, 14B and 14C) and the bellows tank 1400 depicted in FIG. 15.

FIG. 18 schematically depicts a a pressurized primary (1st stage) membrane bank system 1700 comprising a pressurized membrane bank 1710. The pressurized membrane bank 1710 may comprise embodiments of pressurized membrane banks 900, 1000, 1100, 1200 described above and depicted in FIGS. 10 through 13. Membrane bank system 1700 has a pressure differential apparatus 1702 upstream of the pressurized membrane bank, where the pressure differential apparatus may comprise the various embodiments depicted in FIG. 14 (including 14A, 14B and 14C) and the bellows tank 1400 depicted in FIG. 15. Membrane bank system 1700 also has a pressure differential apparatus 1712 downstream of the pressurized membrane bank 1710, where the pressure differential apparatus may again comprise the various embodiments depicted in FIG. 14 (including 14A, 14B and 14C) and the bellows tank 1400 depicted in FIG. 15. The pressurized membrane bank 1700 may also have a pressure control apparatus 1714 on the residue stream.

FIG. 19 schematically depicts a two stages enrichment system 1800 with both stages having pressurized membrane banks 1810. Membrane banks 1810 may comprises membrane banks 900, 1000, 1100, 1200 described above and as depicted in any of FIGS. 10 through 13 and configured as pressurized membrane bank systems 1500, 1700 as described above and depicted in either FIG. 16 or 18.

FIG. 20 schematically depicts a two stages enrichment system 1900 with a first stage system 1910 which may be configured utilizing draft membrane system 1600 as described above and depicted in FIG. 17. Second stage 1920 may be configured as a pressurized membrane bank system utilizing pressurized bank systems 1500, 1700 as as described above and depicted in FIG. 16 or 18.

FIG. 21 schematically depicts a three stage of an enrichment system 2000 comprising a first stage 2010, a second stage 2012 and a third stage 2014. First stage first 2010 and the second stage 2012 may utilize a two-stage enrichment system utilizing the configuration of two stage system 1800 described above and as depicted in FIG. 19. Third stage 2014 comprises a conduit 2016 which provides a recycled residue stream to the intake of the second stage 2012.

FIG. 21A schematically depicts a three stage of an enrichment system 2000' comprising a first stage 2010', a second stage 2012' and a third stage 2014'. First stage first 2010' and the second stage 2012' may utilize a two-stage enrichment system utilizing the configuration of two stage system 1800 described above and as depicted in FIG. 19. Third stage

2014' comprises a conduit 2016' which provides a recycled residue stream to the intake of the second stage 2012'. However enrichment system 2000' further comprises a dessicant or refrigeration apparatus 2008 between the first stage 2010' and the second stage 2012' configured to provide water removal from the gas prior to entry into the second stage as well as provide an optional outlet stream of water.

FIG. 22 schematically depicts a three stage enrichment system 2100 comprising a first stage 2110, a second stage 2112 and a third stage 2114. First stage first 2110 and second stage 2112 may a two-stage enrichment system utilizing the configuration of two stage system 1900 described above and as depicted in FIG. 20. Third stage 2114 comprises a conduit 2116 which provides a recycled residue stream to the intake of the second stage 2112.

FIG. 22A schematically depicts a three stage of an enrichment system 2100' comprising a first stage 2110', a second stage 2112' and a third stage 2114'. First stage first 2110' and the second stage 2112' may utilize a two-stage enrichment system utilizing the configuration of two stage system 1900 described above and as depicted in FIG. 20. Third stage 2114' comprises a conduit 2116' which provides a recycled residue stream to the intake of the second stage 2112'. However enrichment system 2100' further comprises a dessicant or refrigeration apparatus 2108 between the first stage 2110' and the second stage 2112' configured to provide water removal from the gas prior to entry into the second stage as well as provide an optional outlet stream of water.

FIG. 23 schematically depicts a flue gas generator 2200 with conventional combustion air feed and fuel gas, having a cooling apparatus C and a gas driver apparatus D on the flue gas. FIG. 24 schematically depicts a flue gas generator 2200' similar to that depicted in FIG. 23 but further comprising a combustion air enrichment apparatus 2202. Air enrichment apparatus may include in of the systems 1500, 1600, 1700, 1800, 1900, 2000 and 2100 described above and as depicted in FIGS. 16 through 22 to enrich the combustion air to the burner. FIG. 25 schematically depicts a pressurized flue gas generator 2200" having a liquid water removal apparatus L on the flue gas discharge and a combustion air enrichment apparatus 2202 with recycled and cooled flue gas to flue gas feed. Air enrichment apparatus may include in of the systems 1500, 1600, 1700, 1800, 1900, 2000 and 2100 described above and as depicted in FIGS. 16 through 22 to enrich the combustion air to the burner.

FIG. 26 schematically depicts a flue gas generator F having flue gas discharged to an air cooler fan 2302 and processed through cooling apparatus C. A draft membrane bank 2300 is disposed at the air cooler fan discharge 2304 for improving draft membrane unit performance, where the draft membrane banks may comprise draft membrane banks 600, 700 and 800 as described above and depicted in FIGS. 7 through 9.

FIG. 27 depicts an enrichment system 2400 deployed within an orchard comprising trees T. It is to be appreciated that a tree orchard may be utilized as a sequestering facility which utilizes photosynthetic organisms (trees) to sequester carbon dioxide. Enrichment system 2400 may comprise a plurality of membrane units 2410 as disclosed herein. Membrane units 2410 may capture and enrich carbon dioxide in the vicinity of the trees T. Membrane units 2410 may also be disposed around the perimeter of the orchard to capture "fugitive" carbon dioxide which has not been utilized in photosynthesis. Moreover, for orchards utilizing carbon dioxide emitting mechanisms, such as flue gas generators, for support purposes, the enrichment system may be utilized to both make those flue gas generators more fuel efficient by increasing oxygen concentration in the intake air and to also capture carbon dioxide in the exhaust and enrich and cool it for application to the orchard. Thus, enrichment system 2400 may further comprise a stationary or mobile flue gas generator 2450. Flue gas generator 2450 may have an economizer (not shown). Membrane units 2410 may also be utilized to provide oxygen enriched air to the intake of the flue gas generator 2450. Flue gas generator 2450 may provide a flue gas having elevated level of carbon dioxide which may be enriched with membrane units 24an enriched stream of carbon dioxide in an agricultural application. Flue gas generator 2450 may send hot gas to one or more cooling devices 2452 which may comprise a dry ice containment or a quench column device. Discharge from cooling devices 2452 will have an enriched carbon dioxide concentration which may be pressurized by a blower 2454 for further distribution for either distribution to trees T or to provide additional cooling for the air intake of the flue gas generator 2450. A vacuum pump 2456 may be utilized to provide vacuum to the various membrane units 2410.

As indicated, FIG. 27 depicts the following flow streams for five different cases

1—fuel gas to the flue gas generator

2—enriched O2/CO2 from the membrane permeate header to vacuum pump 2456.

3.—dried CO2 recirculated for cooling.

4.—intake at vacuum pump 2456.

5.—vacuum pump discharge for cooling into the flue gas generator economizer.

6.—hot exhaust from the flue gas generator 2450.

7.—cooled gas discharge from blower 2454.

8.—intake to second cooling device 2454.

9.—enriched CO2 stream for orchard distribution.

The tables presented below provide examples of the heat and material balances which may be realized utilizing a system as shown in FIG. 27 for five different scenarios utilizing the presently disclosed Membrane Air Enrichment ("MAE") process in a ten tree orchard utilized as a sequestration facility.

TABLE 1 for Case 1: Simplified Heat and Material Balance for MAE Process

Air Feed Case (20.8% O2)

BASIS: 50 Tons CO2/Y for 10 almond trees, Quench Makes 35 Tons Water/Y

| Stream Numbers | 1 | 2 | 3 | 4 | 5 | 6 | 7 | 8 |
|---|---|---|---|---|---|---|---|---|
| Process Parameters/Stream Names | Fuel**** | Air | Dry Recirc | Vac Suct | Vac Disch | Flue Gas | Cool FG | Crop Carbon |
| Absolute Pressure, psia | 25 | 14.7 | N/A | N/A | N/A | 14.7 | 15 | 15 |
| Temperature F. ** | Ambient | Ambient | | | | 350 | 90 | 90 |
| Gas Standard Volumetric Rate, SCFM | 6.32 | 60.70 | | | | 67.02 | 55.83 | 55.83 |
| Total Molar Flow Rate-LbMole/Hr) | 1 | 9.602 | | | | 10.602 | 8.831288 | 8.83128782 |
| Mole Balance, lb mols/hr | | | | | | | | |
| Methane (CH4-LbMole/Hr) | 1 | 0 | | | | 0 | 0 | 0 |
| Oxygen (O2-LbMole/Hr) | 0 | 2 | | | | 0 | 0 | 0 |
| Nitrogen (N2-LbMole/Hr) | 0 | 7.4 | | | | 7.4 | 7.4 | 7.4 |
| Water (H2O-LbMole/Hr) | 0 | 0.196 | | | | 2.196 | 0.41957 | 0.4195703 |
| Carbon Dioxide (CO2-LbMole/Hr) | 0 | 0.006 | | | | 1.006 | 1.006 | 1.006 |
| Mole Percent | | | | | | | | |
| Methane (CH4-Mole Percent) | 100.0 | 0.0 | | | | 0.0 | 0.0 | 0.0 |
| Oxygen (O2-Mole Percent) | 0.0 | 20.8 | | | | 0.0 | 0.0 | 0.0 |
| Nitrogen (N2-Mole Percent) | 0.0 | 77.1 | | | | 69.8 | 83.8 | 83.8 |
| Water (H2O-Mole Percent) | 0.0 | 2.0 | | | | 20.7 | 4.8 | 4.8 |
| Carbon Dioxide (CO2-Mole Percent) | 0.0 | 0.0625 | | | | 9.5 | 11.4 | 11.4 |
| Total | 100.0 | 100.0 | | | | 100.0 | 100.0 | 100.0 |
| Mass Balance, Tons/yr | | | | | | | | |
| Methane (CH4-Tons/yr) | 17.5 | 0.0 | | | | 0.0 | 0.0 | 0.0 |
| Oxygen (O2-Tons/yr) | 0.0 | 70.1 | | | | 0.0 | 0.0 | 0.0 |
| Nitrogen (N2-Tons/yr) | 0.0 | 226.9 | | | | 226.9 | 226.9 | 226.9 |
| Water (H2O-Tons/yr) | 0.0 | 3.9 | | | | 43.3 | 8.3 | 8.3 |
| Carbon Dioxide (CO2-Tons/yr) | 0.0 | 0.3 | | | | 48.5 | 48.5 | 48.5 |
| Total, Tons/yr | 17.5 | 301.1 | | | | 318.6 | 283.6 | 283.6 |

TABLE 2 for Case 2 Simplified Heat and Material Balance for MAE Process
33% O2 Enrich Feed Case
BASIS: 50 Tons CO2/Y for 10 almond trees, Quench Makes 35 Tons Water/Y
Gross 30% Increase in Duty of Steam/Power Generation-Net 20% Increase with vacuum pump deduct

| Stream Numbers | 1 | 3 | 3 | 4 | 5 | 6 | 7 | 8 |
|---|---|---|---|---|---|---|---|---|
| Process Parameters/Stream Names | Fuel Gas | Enrich O2 | Dry Recirc | Vac Suct | Vac Disch | Flue Gas | Cool FG | Crop Carbon |
| Absolute Pressure, psia | 25 | 3.8 | N/A | 3.8 | 16 | 14.7 | 15 | 15 |
| Temperature F. ** | Ambient | Ambient | | Ambient | 200 | 350 | 90 | 90 |
| Gas Standard Volumetric Rate, SCFM | 6.32 | 38.71 | | 38.71 | 37.93 | 45.04 | 37.51 | 37.51 |
| Total Molar Flow Rate-LbMole/Hr) | 1 | 6.124 | | 6.124 | 6 | 7.124 | 5.934172 | 5.93417227 |
| | | | Mole Balance, lb mols/hr | | | | | |
| Methane (CH4-LbMole/Hr) | 1 | 0 | | 0 | 0 | 0 | 0 | 0 |
| Oxygen (O2-LbMole/Hr) | 0 | 2 | | 2 | 2 | 0 | 0 | 0 |
| Nitrogen (N2-LbMole/Hr) | 0 | 4 | | 4 | 4 | 4 | 4 | 4 |
| Water (H2O-LbMole/Hr) | 0 | 0.12 | | 0.12 | 0 | 2.12 | 0.28193 | 0.28192971 |
| Carbon Dioxide (CO2-LbMole/Hr) | 0 | 0.004 | | 0.004 | 0 | 1.004 | 1.004 | 1.004 |
| | | | Mole Percent | | | | | |
| Methane (CH4-Mole Fraction) | 100.0 | 0.0 | | 0.0 | 0.0 | 0.0 | 0.0 | 0.0 |
| Oxygen (O2-Mole Fraction) | 0.0 | 32.7 | | 32.7 | 33.3 | 0.0 | 0.0 | 0.0 |
| Nitrogen (N2-Mole Fraction) | 0.0 | 65.3 | | 65.3 | 66.7 | 56.1 | 67.4 | 67.4 |
| Water (H2O-Mole Fraction) | 0.0 | 2.0 | | 2.0 | 0.0 | 29.8 | 4.8 | 4.8 |
| Carbon Dioxide (CO2-Mole Fraction) | 0.0 | 0.0653 | | 0.0653 | 0.0000 | 14.1 | 16.9 | 16.9 |
| Total | 100.0 | 100.0 | | 100.0 | 100.0 | 100.0 | 100.0 | 100.0 |
| | | | Mass Balance, Tons/yr *** | | | | | |
| Methane (CH4-Tons/yr) | 17.5 | 0.0 | | 0.0 | 0.0 | 0.0 | 0.0 | 0.0 |
| Oxygen (O2-Tons/yr) | 0.0 | 70.1 | | 70.1 | 70.1 | 0.0 | O.C | 0.0 |
| Nitrogen (N2-Tons/yr) | 0.0 | 122.6 | | 122.6 | 122.6 | 122.6 | 122.6 | 122.6 |
| Water (H2O-Tons/yr) | 0.0 | 2.4 | | 2.4 | 0.0 | 41.8 | 5.6 | 5.6 |
| Carbon Dioxide (CO2-Tons/yr) | 0.0 | 0.2 | | 0.2 | 0.0 | 48.4 | 48.4 | 48.4 |
| Total, Tons/yr | 17.5 | 195.3 | | 195.3 | 192.7 | 212.8 | 176.6 | 176.6 |

TABLE 3 for Case 3
Heat and Material Balances for New MAE Process: BASIS 50 Tons/Year CO2 for 10 almond trees Using Quench
40% Increase in Duty of Existing Steam/Power Generation Device

| Stream Numbers | 1 | 2 | 3 | 4 | 5 | 6 | 7 | 8 |
|---|---|---|---|---|---|---|---|---|
| Process Parameters/ Stream Names | Fuel**** | Comb O2 | Dry Recirc | Vac Suct | Vac Disch | Flue Gas | Cool FG | Crop Carbon |
| Absolute Pressure, psia | 25 | 3.8 | 3.8 | 3.8 | 16 | 15 | 16 | 15 |
| Temperature F. ** | Ambient | Ambient | 50 | Ambient | 200 | 350 | 170 | 60 |
| Gas Standard Volumetric Rate, SCFM | 6.32 | 25.81 | 9.65 | 35.46 | 35.46 | 41.78 | 28.95 | 19.30 |
| Total Molar Flow Rate-LbMole/Hr) | 1 | 4.083 | 1.52666667 | 5.609667 | 5.609667 | 6.609667 | 4.579667 | 3.053 |
| | | | Mole Balance, lb mols/hr | | | | | |
| Methane (CH4-LbMole/Hr) | 1 | 0 | 0 | 0 | 0 | 0 | 0 | 0 |
| Oxygen (O2-LbMole/Hr) | 0 | 2 | 0 | 2 | 2 | 0 | 0 | 0 |
| Nitrogen (N2-LbMole/Hr) | 0 | 2 | 1 | 3 | 3 | 3 | 3 | 2 |
| Water (H2O-LbMole/Hr) | 0 | 0.08 | 0 | 0.08 | 0.08 | 2.08 | 0 | 0 |
| Carbon Dioxide (CO2-LbMole/Hr) | 0 | 0.003 | 0.52666667 | 0.529667 | 0.529667 | 1.529667 | 1.579667 | 1.053 |
| | | | Mole Percent | | | | | |
| Methane (CH4-Mole Fraction) | 100.0 | 0.0 | 0.0 | 0.0 | 0.0 | 0.0 | 0.0 | 0.0 |
| Oxygen (O2-Mole Fraction) | 0.0 | 49.0 | 0.0 | 35.7 | 35.7 | 0.0 | 0.0 | 0.0 |
| Nitrogen (N2-Mole Fraction) | 0.0 | 49.0 | 65.5 | 53.5 | 53.5 | 45.4 | 65.5 | 65.5 |
| Water (H2O-Mole Fraction) | 0.0 | 2.0 | 0.0 | 1.4 | 1.4 | 31.5 | 0.0 | 0.0 |
| Carbon Dioxide (CO2-Mole Fraction) | 0.0 | 0.07 | 34.5 | 9.4 | 9.4 | 23.1 | 34.5 | 34.5 |
| Total | 100.0 | 100.0 | 100.0 | 100.0 | 100.0 | 100.0 | 100.0 | 100.0 |

TABLE 3-continued for Case 3
Heat and Material Balances for New MAE Process: BASIS 50 Tons/Year CO2 for 10 almond trees Using Quench
40% Increase in Duty of Existing Steam/Power Generation Device

| Stream Numbers | 1 | 2 | 3 | 4 | 5 | 6 | 7 | 8 |
|---|---|---|---|---|---|---|---|---|
| | | | | Mass Balance, Tons/yr *** | | | | |
| Methane (CH4-Tons/yr) | 17.5 | 0.0 | 0.0 | 0.0 | 0.0 | 0.0 | 0.0 | 0.0 |
| Oxygen (O2-Tons/yr) | 0.0 | 70.1 | 0.0 | 70.1 | 70.1 | 0.0 | 0.0 | 0.0 |
| Nitrogen (N2-Tons/yr) | 0.0 | 61.3 | 30.7 | 92.0 | 92.0 | 92.0 | 92.0 | 61.3 |
| Water (H2O-Tons/yr) | 0.0 | 1.6 | 0.0 | 1.6 | 1.6 | 41.0 | 0.0 | 0.0 |
| Carbon Dioxide (CO2-Tons/yr) | 0.0 | 0.1 | 25.4 | 25.5 | 25.5 | 73.7 | 76.1 | 50.7 |
| Total, Tons/yr | 17.5 | 133.1 | 56.0 | 189.2 | 189.2 | 206.7 | 168.1 | 112.1 |

TABLE 4 for Case 4
Heat and Material Balances for New MAE 50% 50T/Year CO2
50% O2 Enrich Without Recirc
60% Increase in Duty of New Steam/Power Generation

| Stream Numbers | 1 | 2 | 3 | 4 | 5 | 6 | 7 | 8 |
|---|---|---|---|---|---|---|---|---|
| Process Parameters/Stream Names | Fuel**** | Comb O2 | Dry Recirc | Vac Suct | Vac Disch | Flue Gas | Cool FG | Crop Carbon |
| Absolute Pressure, psia | 25 | 3.8 | | | 16 | | 16 | 15 |
| Temperature F. ** | Ambient | Ambient | | Ambient | 200 | | 170 | 60 |
| Gas Standard Volumetric Rate, SCFM | 6.32 | 25.81 | | | 25.81 | 32.13 | 19.30 | 19.30 |
| Total Molar Flow Rate-LbMole/Hr) | 1 | 4.083 | | | 4.083 | 5.083 | 3.053 | 3.053 |
| | | | | Mole Balance, lb mols/hr | | | | |
| Methane (CH4-LbMole/Hr) | 1 | 0 | 0 | 0 | 0 | 0 | 0 | 0 |
| Oxygen (O2-LbMole/Hr) | 0 | 2 | 0 | 2 | 2 | 0 | 0 | 0 |
| Nitrogen (N2-LbMole/Hr) | 0 | 2 | 0 | 2 | 2 | 2 | 2 | 2 |
| Water (H2O-LbMole/Hr) | 0 | 0.08 | 0 | 0.08 | 0.08 | 2.08 | 0 | 0 |
| Carbon Dioxide (CO2-LbMole/Hr) | 0 | 0.003 | 0 | 0.003 | 0.003 | 1.003 | 1.053 | 1.053 |
| | | | | Mole Percent | | | | |
| Methane (CH4-Mole Fraction) | 100.0 | 0.0 | 0 | 0.0 | 0.0 | 0.0 | 0.0 | 0.0 |
| Oxygen (O2-Mole Fraction) | 0.0 | 49.0 | 0 | 49.0 | 49.0 | 0.0 | 0.0 | 0.0 |
| Nitrogen (N2-Mole Fraction) | 0.0 | 49.0 | 0 | 49.0 | 49.0 | 39.3 | 65.5 | 55.5 |
| Water (H2O-Mole Fraction) | 0.0 | 2.0 | 0 | 2.0 | 2.0 | 40.9 | 0.0 | 0.0 |
| Carbon Dioxide (CO2-Mole Fraction) | 0.0 | 0.07 | 0 | 0.1 | 0.1 | 19.7 | 34.5 | 34.5 |
| Total | 100.0 | 100.0 | 0 | 100.0 | 100.0 | 100.0 | 100.0 | 100.0 |
| | | | | Mass Balance, Tons/yr *** | | | | |
| Methane (CH4-Tons/yr) | 17.5 | 0.0 | 0.0 | 0.0 | 0.0 | 0.0 | 0.0 | 0.0 |
| Oxygen (O2-Tons/yr) | 0.0 | 70.1 | 0.0 | 70.1 | 70.1 | 0.0 | 0.0 | 0.0 |
| Nitrogen (N2-Tons/yr) | 0.0 | 61.3 | 0.0 | 61.3 | 61.3 | 61.3 | 61.3 | 61.3 |
| Water (H2O-Tons/yr) | 0.0 | 1.6 | 0.0 | 1.6 | 1.6 | 41.0 | 0.0 | 0.0 |
| Carbon Dioxide (CO2-Tons/yr) | 0.0 | 0.1 | 0.0 | 0.1 | 0.1 | 48.3 | 50.7 | 50.7 |
| Total, Tons/yr | 17.5 | 133.1 | 0.0 | 133.1 | 133.1 | 150.6 | 112.1 | 112.1 |

TABLE 5 for Case 5
Heat and Material Balances for New MAE Process: BASIS 80 Tons/Year CO2 for 10 almond trees Using 9.6 Tons/Yr Dry Ice
Standard Air to Bio Gas Supplemented with Natural Gas

| Stream Numbers | 1 | 2 | 3 | 4 | 5A | 6 | 7 | 8 |
|---|---|---|---|---|---|---|---|---|
| Process Parameters/Stream Names | Fuel | Comb O2 | Dry Recirc | Vac Suct | Air | Flue Gas | Cool FG | Crop Carbon |
| Absolute Pressure, psia | 25 | 3.8 | 3.8 | 3.8 | 14.7 | 15 | 16 | 15 |
| Temperature F. ** | Ambient | Ambient | 50 | Ambient | Ambient | 350 | 170 | 60 |
| Gas Standard Volumetric Rate, SCFM | 9.17 | 0.00 | 0.00 | 0.00 | 60.69 | 69.85 | 57.24 | 57.24 |
| Total Molar Flow Rate-LbMole/Hr) | 1.45 | 0 | 0 | 0 | 9.6 | 11.05 | 9.054 | 9.054 |
| Mole Balance, lb mols/hr | | | | | | | | |
| Methane (CH4-LbMole/Hr) | 1 | 0 | 0 | 0 | 0 | 0 | 0 | 0 |
| Oxygen (O2-LbMole/Hr) | 0 | 0 | 0 | 0 | 2 | 0 | 0 | 0 |
| Nitrogen (N2-LbMole/Hr) | 0 | 0 | 0 | 0 | 7.4 | 7.4 | 7.4 | 7.4 |
| Water (H2O-LbMole/Hr) | 0 | 0 | 0 | 0 | 0.196 | 2.196 | 0 | 0 |
| Carbon Dioxide (CO2-LbMole/Hr) | 0.45 | 0 | 0 | 0 | 0.004 | 1.454 | 1.654 | 1.654 |
| Mole Percent | | | | | | | | |
| Methane (CH4-Mole Fraction) | 69.0 | 0.0 | 0 | 0.0 | 0.0 | 0.0 | 0.0 | 0.0 |
| Oxygen (O2-Mole Fraction) | 0.0 | 0.0 | 0 | 0.0 | 20.8 | 0.0 | 0.0 | 0.0 |
| Nitrogen (N2-Mole Fraction) | 0.0 | 0.0 | 0 | 0.0 | 77.1 | 67.0 | 81.7 | 81.7 |
| Water (H2O-Mole Fraction) | 0.0 | 0.0 | 0 | 0.0 | 2.0 | 19.9 | 0.0 | 0.0 |
| Carbon Dioxide (CO2-Mole Fraction) | 31.0 | 0.00 | 0 | 0.0 | 0.0 | 13.2 | 18.3 | 18.3 |
| Total | 100.0 | 0.0 | 0.0 | 0.0 | 100.0 | 100.0 | 100.0 | 100.0 |
| Mass Balance, Tons/yr *** | | | | | | | | |
| Methane (CH4-Tons/yr) | 17.5 | 0.0 | 0.0 | 0.0 | 0.0 | 0.0 | 0.0 | 0.0 |
| Oxygen (O2-Tons/yr) | 0.0 | 0.0 | 0.0 | 0.0 | 70.1 | 0.0 | 0.0 | 0.0 |
| Nitrogen (N2-Tons/yr) | 0.0 | 0.0 | 0.0 | 0.0 | 226.9 | 226.9 | 226.9 | 226.9 |
| Water (H2O-Tons/yr) | 0.0 | 0.0 | 0.0 | 0.0 | 3.9 | 43.3 | 0.0 | 0.0 |
| Carbon Dioxide (CO2-Tons/yr) | 21.7 | 0.0 | 0.0 | 0.0 | 0.2 | 70.1 | 79.7 | 79.7 |
| Total, Tons/yr | 39.2 | 0.0 | 0.0 | 0.0 | 301.0 | 340.2 | 306.6 | 306.6 |

While the above is a description of various embodiments of the present invention, further modifications may be employed without departing from the spirit and scope of the present invention. Thus the scope of the invention should not be limited according to these factors, but according to the claims of the forthcoming non-provisional patent application.

What is claimed is:

1. An apparatus for direct air capture of gas components from an ambient environment, the apparatus comprising:

a shell-less membrane unit comprising a selective barrier having a shell-less side and an opposite side, wherein the shell-less side of the selective barrier is at atmospheric pressure and the opposite side is at a first pressure other than atmospheric pressure, resulting in a pressure differential across the selective barrier, wherein the first pressure is at a pressure lower than atmospheric pressure or at a pressure higher than atmospheric pressure, wherein the side of the selective barrier, be it either the opposite side or the shell-less side, having the higher pressure is exposed to a first concentration of fast gas components and a first concentration of slow gas components, wherein a portion of fast gas components and a portion of slow gas components flow through the selective barrier to form a permeate stream on the side of the selective barrier with the lower pressure as a result of the pressure differential across the selective barrier, wherein the permeate stream comprises a second concentration of fast gas components and a second concentration of slow gas components, wherein the second concentration of fast gas components is greater than the first concentration of fast gas components and the second concentration of slow gas components is less than the first concentration of slow gas components; and a pressure differential device which applies the pressure differential across the selective barrier of the shell-less membrane unit, the pressure differential device selected from the group consisting of a liquid ring vacuum system, a reciprocating compressor system, a centrifugal blower system, and a bellows tank.

2. The apparatus of claim 1 wherein the gas from the ambient environment is drawn into the shell-less membrane's shell-less side with a pressure differential device pulling a vacuum on the opposite side of the membrane, producing the permeate stream on the lower pressure opposite side of the membrane.

3. The apparatus of claim 1 wherein the gas from the ambient environment is drawn into the opposite side of the selective barrier with a pressure differential device forming a pressure higher than atmospheric pressure on the opposite side of the selective barrier, producing the permeate stream on the lower atmospheric pressure shell-less side of the membrane.

4. The apparatus of claim 3 wherein the plurality of shell-less membrane units is configured into a membrane bank that has been disposed within a shell.

5. The apparatus of claim 4 comprising a conduit for delivery of at least a portion of a residue stream leaving the opposite side of the selective barrier.

6. The apparatus of claim 5 wherein the conduit is pressure controlled with a pressure control valve to adjust a residue stream pressure on the opposite side of the selective barrier to control a slow gas concentration quality and a slow gas rate in the at least a portion of the residue stream.

7. The apparatus of claim 1 comprising a plurality of shell-less membrane units configured into a membrane bank.

8. The apparatus of claim 1 wherein the permeate stream is directed to a permeate processing facility.

9. The apparatus of claim 8 wherein the permeate processing facility comprises a flue gas generator.

10. The apparatus of claim 8 wherein the permeate processing facility comprises a second stage apparatus which processes at least a portion of the first permeate stream into a second permeate stream having a third concentration of fast gas components and a third concentration of slow gas components, wherein the third concentration of fast gas components is greater than the second concentration of fast gas components and the third concentration of slow gas components is less than the second concentration of slow gas components, and at least a portion of the second permeate stream is delivered to a second permeate processing facility.

11. The apparatus of claim 8 wherein the processing facility comprises a sequestration facility.

12. The apparatus of claim 11 wherein the sequestration facility comprises a plurality of photosynthetic organisms.

13. An apparatus for direct air capture of gas components from an ambient environment, the apparatus comprising:

a shell-less membrane unit comprising a selective barrier having a shell-less side and an opposite side, wherein the shell-less side of the selective barrier is at atmospheric pressure and the opposite side is at a pressure less than atmospheric pressure, wherein the shell-less side is exposed to a first concentration of fast gas components and a first concentration of slow gas components, wherein a portion of fast gas components and a portion of slow gas components flow through the selective barrier to form a permeate stream on the opposite side as a result of a pressure differential across the selective barrier;

a pressure differential device which applies the pressure differential across the selective barrier of the shell-less membrane unit, the pressure differential device selected from the group consisting of a liquid ring vacuum system, a reciprocating compressor system, a centrifugal blower system, and a bellows tank;

wherein the permeate stream comprises a second concentration of fast gas components and a second concentration of slow gas components, wherein the second concentration of fast gas components is greater than the first concentration of fast gas components and the second concentration of slow gas components is less than the first concentration of slow gas components.

14. The apparatus of claim 13 comprising a plurality of shell-less membrane units configured into a membrane bank.

15. The apparatus of claim 13 wherein the permeate stream is directed to a permeate processing facility.

16. The apparatus of claim 13 wherein the pressure differential device is configured to apply a vacuum from the opposite side of the selective barrier.

17. The apparatus of claim 15 wherein the permeate processing facility comprises a flue gas generator.

18. The apparatus of claim 15 wherein the permeate processing facility comprises a second stage apparatus which processes at least a portion of the first permeate stream into a second permeate stream having a third concentration of fast gas components and a third concentration of slow gas components, wherein the third concentration of fast gas components is greater than the second concentration of fast gas components and the third concentration of slow gas components is less than the second concentration of slow gas components, and at least a portion of the second permeate stream is delivered to a second permeate processing facility.

* * * * *